(12) United States Patent
Li et al.

(10) Patent No.: US 11,329,810 B2
(45) Date of Patent: May 10, 2022

(54) CONTINUOUS-VARIABLE QUANTUM KEY DISTRIBUTION DEVICE AND METHOD

(71) Applicant: HUAWEI TECHNOLOGIES CO., LTD., Guangdong (CN)

(72) Inventors: Zhengyu Li, Shenzhen (CN); Changzheng Su, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 16/817,125

(22) Filed: Mar. 12, 2020

(65) Prior Publication Data

US 2020/0213105 A1 Jul. 2, 2020

Related U.S. Application Data

(63) Continuation of application No. PCT/CN2018/104995, filed on Sep. 11, 2018.

(30) Foreign Application Priority Data

Sep. 15, 2017 (CN) .......................... 201710843689.8

(51) Int. Cl.
| | | |
|---|---|---|
| *H04L 9/08* | (2006.01) | |
| *H04B 10/516* | (2013.01) | |
| *H04B 10/70* | (2013.01) | |

(52) U.S. Cl.
CPC ......... *H04L 9/0852* (2013.01); *H04B 10/516* (2013.01); *H04B 10/70* (2013.01); *H04L 9/0819* (2013.01); *H04L 9/0869* (2013.01)

(58) Field of Classification Search
USPC ........ 380/255, 264, 276, 278; 713/150, 163, 713/181; 726/2, 21, 36
See application file for complete search history.

(56) References Cited

U.S. PATENT DOCUMENTS 5,764,765 A * 6/1998 Phoenix ................ H04L 9/0858
380/256
6,748,083 B2 * 6/2004 Hughes .................. H04B 10/70
380/260
(Continued)

FOREIGN PATENT DOCUMENTS

| CN | 102724036 A | 10/2012 |
|---|---|---|
| CN | 103258428 A | 8/2013 |

(Continued)

OTHER PUBLICATIONS

Office Action issued in Chinese Application No. 201710843689.8 dated Jan. 27, 2021, 8 pages.

(Continued)

*Primary Examiner* — Sharif E Ullah
(74) *Attorney, Agent, or Firm* — Fish & Richardson P.C.

(57) ABSTRACT

This application discloses a continuous-variable quantum key distribution (CV-QKD) device and method. The device includes a light source, a modulation unit, a first random number generator, and a processor, where the processor is configured to obtain a first data sequence based on a preset quantity of modulation format symbols, a distribution probability of each symbol, and a first random number sequence generated by the first random number generator, and obtain a second data sequence based on the first data sequence; and the modulation unit is configured to modulate, based on to the first data sequence, a signal emitted by the light source to output a second optical signal, where the second optical signal does not need to include quantum states with a quantity in an order of magnitude of $2^8 \times 2^8$ required in an existing Gaussian protocol.

8 Claims, 11 Drawing Sheets

(56) References Cited

U.S. PATENT DOCUMENTS

| | | | | |
|---|---|---|---|---|
| 7,437,081 | B2* | 10/2008 | Mitchell | H04B 10/70 380/256 |
| 8,855,316 | B2* | 10/2014 | Wiseman | H04L 9/0855 380/278 |
| 9,960,465 | B2* | 5/2018 | Dudley | H01M 10/6557 |
| 10,057,058 | B2* | 8/2018 | Murakami | H04L 9/0858 |
| 2005/0138352 | A1* | 6/2005 | Gauvreau | H04L 9/3247 713/153 |
| 2005/0221759 | A1* | 10/2005 | Spadafora | G08G 1/09 455/41.2 |
| 2007/0065154 | A1* | 3/2007 | Luo | H04J 14/0246 398/141 |
| 2007/0076884 | A1* | 4/2007 | Wellbrock | H04L 9/0858 380/263 |
| 2007/0195774 | A1* | 8/2007 | Sherman | H04L 69/16 370/392 |
| 2011/0206204 | A1* | 8/2011 | Sychev | H04J 14/0212 380/256 |
| 2011/0213979 | A1* | 9/2011 | Wiseman | H04L 9/0855 713/171 |
| 2014/0010234 | A1* | 1/2014 | Patel | H04L 45/74 370/392 |
| 2014/0068765 | A1* | 3/2014 | Choi | H04L 63/1416 726/23 |
| 2014/0133652 | A1* | 5/2014 | Oshida | H04L 9/0897 380/255 |
| 2016/0155327 | A1* | 6/2016 | Schlienz | G08G 1/07 340/907 |
| 2016/0241396 | A1* | 8/2016 | Fu | H04L 9/0836 |
| 2016/0359626 | A1* | 12/2016 | Fu | H04L 9/0858 |
| 2016/0366094 | A1* | 12/2016 | Mason | H04L 61/2038 |
| 2017/0214525 | A1* | 7/2017 | Zhao | H04W 12/041 |
| 2017/0230173 | A1* | 8/2017 | Choi | H04L 9/0891 |
| 2018/0176091 | A1* | 6/2018 | Yoon | H04L 41/0896 |
| 2019/0036821 | A1* | 1/2019 | Levy | G06F 12/0868 |
| 2019/0349392 | A1* | 11/2019 | Wetterwald | H04J 3/0667 |
| 2020/0084222 | A1* | 3/2020 | William | H04L 9/0869 |

FOREIGN PATENT DOCUMENTS

| | | |
|---|---|---|
| CN | 104065475 A | 9/2014 |
| CN | 105024809 A | 11/2015 |
| CN | 105679061 A | 6/2016 |
| CN | 105872970 A | 8/2016 |
| CN | 106209363 A | 12/2016 |
| CN | 106685658 A | 5/2017 |
| CN | 106850217 A | 6/2017 |
| CN | 107564306 A | 1/2018 |
| GB | 2427336 A | 12/2006 |

OTHER PUBLICATIONS

Becir et al., "Continuous-variable Quantum Key Distribution protocols with eight-state discrete modulation," ARXIV, International Journal of Quantum Information, Jun. 2010, 18 pages.

Extended European Search Report issued in European Application No. 18857049.3 dated Sep. 25, 2020, 7 pages.

Huang et al., "25 MHz clock continuous-variable quantum key distribution system over 50 km fiber channel," Scientific Reports, Sep. 2015, 9 pages.

Grosshans et al., "Continuous variable quantum cryptography using coherent states," arXiv:quant-ph/0109084v2, Sep. 25, 2001, 6 pages.

Leverrier et al., "Unconditional security proof of long-distance continuous-variable quantum key distribution with discrete modulation," axarXiv:0812.4246v1 [quant-ph], Dec. 22, 2008, 4 pages.

PCT International Search Report and Written Opinion issued in International Application No. PCT/CN2018/104995 dated Nov. 28, 2018, 14 pages (with English translation).

Usenko et al., "Unidimensional continuous-variable quantum key distribution," arXiv:1504.07093v2 [quant-ph], Jan. 11, 2016, 7 pages.

Yang et al., "Source monitoring for continuous-variable quantum key distribution," arXiv:1112 4542v1 [quant-ph], Dec. 20, 2011, 9 pages.

Zhao et al., "Asymptotic security of binary modulated continuous-variable quantum key distribution under collective attacks," Physical Review A 79,(1), 14 pages.

\* cited by examiner

CONTINUOUS-VARIABLE QUANTUM KEY DISTRIBUTION DEVICE AND METHOD

CROSS-REFERENCE TO RELATED APPLICATIONS

This application is a continuation of International Application No. PCT/CN2018/104995, filed on Sep. 11, 2018, which claims priority to Chinese Patent Application No. 201710843689.8, filed on Sep. 15, 2017. The disclosures of the aforementioned applications are hereby incorporated by reference in their entireties.

TECHNICAL FIELD

The present invention relates to the quantum communications field, and in particular, to a discrete-modulation continuous-variable quantum key distribution (CV-QKD) device and method.

BACKGROUND

Quantum communications is a communications technology developed on a basis of a classical information theory and quantum mechanics. A practical quantum communications technology now mainly refers to quantum key distribution (QKD). A main function of a QKD system is to generate a quantum key. The quantum key may be used to encrypt classical information, so that security of a classical information transfer process can be enhanced by rapidly updating a key of an encryption algorithm. QKD may be available in a CV-QKD manner and a discrete-variable quantum key distribution (DV-QKD) manner. DV-QKD usually implements key distribution by encoding a single-photon signal, and requires, in an optical fiber communications band, a single-photon detector working at a low temperature, whereas CV-QKD usually implements key distribution by encoding a coherent state (a weak laser), and does not use a detector that requires low-temperature control. Therefore, CV-QKD is more practical.

During implementation of a CV-QKD system, three important aspects are usually required: (1) Provable security (core): A secure bit rate calculation method that does not depend on any channel assumption should be provided; (2) Easy device manufacturing: An actual system can be manufactured by using an existing technique, and commercialization is implemented; (3) High real performance: A high secure bit rate and a long secure communication distance are required in a typical optical channel. In a CV-QKD model, a coherent state model is a most popular type of commercial model, because the coherent state features easy preparation and low costs in physical implementation, and modulation of the coherent state has relatively high similarity with higher order modulation of classical coherent communications.

A coherent state Gaussian modulation model is a relatively widely applied type of coherent state model. This model is a type of model with highest performance that complies with a current provable security framework. However, there is a problem with the model. To prove security of the model, it is theoretically required to achieve ideal continuous distribution for laser modulation, which is unrealistic in an actual system. Later, some people put forward a provable security approximation theory, but a higher degree of approximation has a higher requirement for modulation precision. In an existing experiment, 8-bit-to-12-bit modulation precision is usually required, which means that constellation points in a constellation diagram reach an order of magnitude of 1 million points. Therefore, precise modulation is quite difficult.

SUMMARY

An objective of the present invention is to propose a discrete-modulation CV-QKD device, to resolve a problem that an existing CV-QKD device has quite large difficulty in modulation while ensuring security.

According to a first aspect, a CV-QKD sending device is provided. The device includes a light source, a modulation unit, a first random number generator, and a processor, where the light source is configured to generate a first optical signal: the first random number generator is configured to generate a first random number sequence; the processor is configured to: receive the first random number sequence, obtain a first data sequence based on a preset quantity of modulation format symbols, a distribution probability of each symbol, and the first random number sequence, and obtain a second data sequence based on the first data sequence, where the first data sequence and the second data sequence are used for obtaining a secure bit rate; and the modulation unit is configured to receive the first optical signal, and modulate the first optical signal based on a control signal to output a second optical signal, where the control signal is generated based on the first data sequence, the second optical signal includes n quantum states, and n is a positive integer not less than 8.

In this embodiment of this application, the second data sequence is introduced, thereby reducing a quantity of quantum states of an output optical signal and reducing implementation difficulty. In addition, strict provable security is provided in this embodiment of this application, thereby satisfying requirements of the industry.

With reference to the first aspect, in a first possible implementation of the first aspect, the obtaining a second data sequence based on the first data sequence specifically includes: obtaining the second data sequence based on a selected probability distribution function in a preset probability distribution function set and an obtained second random number sequence, where the selected probability distribution function is determined based on data in the first data sequence and represents a distribution probability of data in the second data sequence.

With reference to the first aspect, in a second possible implementation of the first aspect, the obtaining a second data sequence based on the first data sequence specifically includes: obtaining fourth data based on a preset probability distribution function and an obtained second random number sequence, and adding a selected value to the fourth data to obtain second data, where the selected value is determined based on data in the first data sequence, the second data sequence includes a plurality of pieces of the second data, and the preset probability distribution function represents a distribution probability of data in the second data sequence.

The foregoing two embodiments are two different manners of obtaining the second data sequence, and both of them can achieve the objective of this application.

With reference to the first or the second possible implementation of the first aspect, in a third possible implementation of the first aspect, the device further includes a second random number generator, configured to generate the second random number sequence.

With reference to the first or the second possible implementation of the first aspect, in a fourth possible implementation of the first aspect, the first random number generator is further configured to generate the second random number sequence in a time division multiplexing manner.

The foregoing two embodiments are manners of generating the second random number sequence, and there is only a need to ensure that the generated second random number sequence is different from the first random number sequence.

With reference to any one of the first aspect or the first to the fourth possible implementations of the first aspect, in a fifth possible implementation of the first aspect, both the first random number sequence and the second random number sequence are uniformly distributed random number sequences. When a uniformly distributed random number sequence is used, complexity of obtaining the first or second data sequence can be reduced, and implementation difficulty can be further reduced.

With reference to the first possible implementation of the first aspect, in a sixth possible implementation of the first aspect, the obtaining the second data sequence based on a selected probability distribution function and an obtained second random number sequence specifically includes: obtaining a value set of second data and an occurrence probability of each value in the value set based on the selected probability distribution function and a preset value range of the second data; and selecting a value of the second data from the value set based on a correspondence between a value represented by M second random numbers and a value in the value set, where the correspondence is set based on an occurrence probability of each value represented by the M second random numbers and the occurrence probability of each value in the value set, at least one value represented by the M second random numbers corresponds to a value in the value set, a sum of occurrence probabilities of the at least one value is the same as a sum of occurrence probabilities of corresponding values in the value set, and M is a positive integer.

With reference to any one of the first aspect or the first to the sixth possible implementations of the first aspect, in a seventh possible implementation of the first aspect, the modulating unit includes a modulator and an attenuator, where the modulator is configured to receive the first optical signal, and modulate the first optical signal based on the control signal to output the second optical signal to the attenuator, where the control signal is generated based on the first data sequence, and the attenuator is configured to attenuate strength of the second optical signal to be less than a first threshold to output the attenuated second optical signal; or the attenuator is configured to: receive the first optical signal, attenuate strength of the first optical signal to be less than a second threshold, and send the attenuated first optical signal to the modulator, and the modulator is configured to modulate the attenuated first optical signal based on the control signal to output the second optical signal, where the control signal is generated based on the first data sequence.

When sending the second optical signal, the CV-QKD sending device needs to attenuate the strength of the second optical signal to an order of magnitude of a quantum. Therefore, it is necessary to introduce the attenuator. A side, of the modulator, on which the attenuator is located does not need to be limited.

With reference to any one of the first aspect or the first to the seventh possible implementations of the first aspect, in an eighth possible implementation of the first aspect, the device further includes a receiver, where the receiver is configured to receive a third data sequence, and the third data sequence includes a random portion of data of a measurement value obtained after the second optical signal passes through an optical channel; and the processor is further configured to: obtain a covariance matrix $$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix}$$

based on the second data sequence and the third data sequence, where $\gamma_A$, $\varphi_{AC}$, and $\gamma_C$ are preset values, $\varphi_{CB}$ is obtained based on the second data sequence and the third data sequence, $\gamma_B$ is obtained based on the third data sequence, and a superscript T represents matrix transposition: obtain, based on the covariance matrix, a value of $\varphi_{AB}$ satisfying a first condition, where the first condition is: $\gamma_{ACB} + i\Omega_N \geq 0$, $\Omega_N$ is an N×N block matrix whose data on a diagonal is all $\Omega$, $$\Omega = \begin{pmatrix} 0 & 1 \\ -1 & 0 \end{pmatrix},$$

and N is a positive integer not less than 3; and calculate secure bit rate values corresponding to all values of $\varphi_{AB}$ satisfying the first condition, to obtain a CV-QKD secure bit rate, where the CV-QKD secure bit rate is a minimum value among the secure bit rate values.

According to a second aspect, a continuous-variable quantum key distribution (CV-QKD) receiving device is provided. The device includes a first receiver, a second receiver, and a processor, where the first receiver is configured to receive a third optical signal, and perform measurement and sampling processing on the third optical signal to obtain a fifth data sequence, where the third optical signal is sent by a sending device and includes n quantum states, n is a positive integer not less than 8, and the fifth data sequence is used for obtaining a secure bit rate: the second receiver is configured to receive a sixth data sequence, where the sixth data sequence includes a random portion of data of a first data sequence of the sending device, and the first data sequence is determined based on a preset quantity of modulation format symbols and a distribution probability of each symbol; and the processor is configured to generate a seventh data sequence based on the sixth data sequence, where the sixth data sequence and the seventh data sequence are used for obtaining a secure bit rate.

This embodiment is applicable to a case in which the sending device does not obtain a second data sequence that is used for obtaining a secure bit rate, and this step is performed by the receiving device.

With reference to the second aspect, in a first possible implementation of the second aspect, the obtaining a seventh data sequence based on the sixth data sequence specifically includes: obtaining the seventh data sequence based on a selected probability distribution function in a preset probability distribution function set and an obtained third random number sequence, where the selected probability distribution function is determined based on data in the sixth data sequence and represents a distribution probability of data in the seventh data sequence.

With reference to the second aspect, in a second possible implementation of the second aspect, the obtaining a seventh data sequence based on the sixth data sequence specifically includes: obtaining eighth data based on a preset probability distribution function and an obtained third random number sequence, and adding a selected value to the eighth data to obtain seventh data, where the selected value is determined based on data in the sixth data sequence, the seventh data sequence includes a plurality of pieces of the seventh data, and the preset probability distribution function represents a distribution probability of data in the seventh data sequence.

With reference to the first or the second possible implementation of the second aspect, in a third possible implementation of the second aspect, the device further includes a third random number generator, configured to generate the third random number sequence.

With reference to any one of the second aspect or the first to the third possible implementations of the second aspect, in a fourth possible implementation of the second aspect, the third random number sequence is a uniformly distributed random number sequence.

With reference to the first possible implementation of the second aspect, in a fifth possible implementation of the second aspect, the obtaining the seventh data sequence based on a selected probability distribution function and an obtained third random number sequence specifically includes: obtaining a value set of sixth data and an occurrence probability of each value in the value set based on the selected probability distribution function and a preset value range of the sixth data, and selecting a value of the seventh data from the value set based on a correspondence between a value represented by M third random numbers and a value in the value set, where the correspondence is set based on an occurrence probability of each value represented by the M third random numbers and the occurrence probability of each value in the value set, at least one value represented by the M third random numbers corresponds to a value in the value set, a sum of occurrence probabilities of the at least one value is the same as a sum of occurrence probabilities of corresponding values in the value set, and M is a positive integer.

With reference to any one of the second aspect or the first to the fifth possible implementations of the second aspect, in a sixth possible implementation of the second aspect, the processor is further configured to:

obtain a covariance matrix $$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix}$$

based on the seventh data sequence and the fifth data sequence, where $\gamma_A$, $\varphi_{AC}$, and $\gamma_C$ are preset values, and $\varphi_{CB}$ is obtained based on the seventh data sequence and the fifth data sequence, $\gamma_B$ is obtained based on the fifth data sequence, and a superscript T represents matrix transposition:

obtain, based on the covariance matrix, a value of $\varphi_{AB}$ satisfying a first condition, where the first condition is: $\gamma_{ACB}+i\Omega_N \geq 0$, $\Omega_N$ is an N×N block matrix whose data on a diagonal is all $\Omega$, $$\Omega = \begin{pmatrix} 0 & 1 \\ -1 & 0 \end{pmatrix},$$

and N is a positive integer not less than 3; and calculate secure bit rate values corresponding to all values of $\varphi_{AB}$ satisfying the first condition, to obtain a CV-QKD secure bit rate, wherein the CV-QKD secure bit rate is a minimum value among the secure bit rate values.

According to a third aspect, a CV-QKD sending device is provided. The sending device includes a light source, a modulation unit, a first random number generator, a processor, and a receiver, where the light source is configured to generate a first optical signal: the first random number generator is configured to generate a first random number sequence; the processor is configured to receive the first random number sequence, and obtain a first data sequence based on a preset quantity of modulation format symbols, a distribution probability of each symbol, and the first random number sequence, where the first data sequence is used for obtaining a secure bit rate; the modulation unit is configured to receive the first optical signal, and modulate the first optical signal based on a control signal to output a second optical signal, where the control signal is generated based on the first data sequence, the second optical signal includes n quantum states, and n is a positive integer not less than 8; and the receiver is configured to receive a third data sequence and a tenth data sequence, where the third data sequence includes a random portion of data of a fifth data sequence, and the tenth data sequence includes all data or a random portion of data of a seventh data sequence; and the processor is further configured to: obtain a covariance matrix $$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix}$$

based on the tenth data sequence and the third data sequence, where $\gamma_A$, $\varphi_{AC}$, and $\gamma_C$ are preset values, $\varphi_{CB}$ is obtained based on the tenth data sequence and the third data sequence, $\gamma_B$ is obtained based on the third data sequence, and a superscript T represents matrix transposition; and obtain, based on the covariance matrix, a value of $\varphi_{AB}$ satisfying a first condition, where the first condition is: $\gamma_{ACB}+i\Omega_N \geq 0$, $\Omega_N$ is an N×N block matrix whose data on a diagonal is all $\Omega$, $$\Omega = \begin{pmatrix} 0 & 1 \\ -1 & 0 \end{pmatrix},$$

and N is a positive integer not less than 3; and calculate secure bit rate values corresponding to all values of $\varphi_{AB}$ satisfying the first condition, to obtain a CV-QKD secure bit rate, where the CV-QKD secure bit rate is a minimum value among the secure bit rate values.

This embodiment of this application is applicable to a case in which the sending device does not obtain a second data sequence that is used for obtaining a secure bit rate, but performs a step of calculating a secure bit rate.

According to a fourth aspect, a CV-QKD receiving device is provided. The receiving device includes a first receiver, a second receiver, and a processor, where the first receiver is configured to receive a third optical signal, and perform measurement and sampling processing on the third optical signal to obtain a fifth data sequence, where the third optical signal is sent by a sending device and includes n quantum states, n is a positive integer not less than 8, and the fifth data sequence is used for obtaining a secure bit rate; and the second receiver is configured to receive a ninth data sequence, where the ninth data sequence is used to generate a secure bit rate; and the processor is configured to obtain a covariance matrix $$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix}$$

based on the ninth data sequence and the fifth data sequence, where $\gamma_A$, $\varphi_{AC}$, and $\gamma_C$ are preset values, and $\varphi_{CB}$ is obtained based on the ninth data sequence and the fifth data sequence, $\gamma_B$ is obtained based on the fifth data sequence, and a superscript T represents matrix transposition; and obtain, based on the covariance matrix, a value of $\varphi_{AB}$ satisfying a first condition, where the first condition is: $\gamma_{ACB} + i\Omega_N \geq 0$, $\Omega_N$ is an N×N block matrix whose data on a diagonal is all $\Omega$, $$\Omega = \begin{pmatrix} 0 & 1 \\ -1 & 0 \end{pmatrix},$$

and N is a positive integer not less than 3; and calculate secure bit rate values corresponding to all values of $\varphi_{AB}$ satisfying the first condition, to obtain a CV-QKD secure bit rate, where the CV-QKD secure bit rate is a minimum value among the secure bit rate values.

The receiving device provided in this embodiment does not perform a procedure of obtaining a second data sequence that is used for obtaining a secure bit rate, and only performs a procedure of calculating a secure bit rate. This is a possible case of this application.

According to a fifth aspect, a CV-QKD sending method is provided. The method includes: generating a first optical signal and a first random number sequence; obtaining a first data sequence based on a preset quantity of modulation format symbols, a distribution probability of each symbol, and the first random number sequence; and obtaining a second data sequence based on the first data sequence, where the first data sequence and the second data sequence are used for obtaining a secure bit rate; and modulating the first optical signal based on the first data sequence to output a second optical signal, where the second optical signal includes n quantum states, and n is a positive integer not less than 8.

This embodiment is a sending method corresponding to the first aspect. The second data sequence is introduced, thereby reducing a quantity of quantum states of an output optical signal and reducing implementation difficulty. In addition, strict provable security is provided in this embodiment, thereby satisfying requirements of the industry.

With reference to the fifth aspect, in a first possible implementation of the fifth aspect, before the obtaining a second data sequence based on the first data sequence, the method further includes: generating a second random number sequence; and the obtaining a second data sequence based on the first data sequence specifically includes: obtaining the second data sequence based on a selected probability distribution function and the second random number sequence, where the selected probability distribution function is determined based on data in the first data sequence.

With reference to the fifth aspect, in a second possible implementation of the fifth aspect, before the obtaining a second data sequence based on the first data sequence, the method further includes: generating a second random number sequence; and the obtaining a second data sequence based on the first data sequence specifically includes: obtaining fourth data based on a preset probability distribution function and the obtained second random number sequence, and adding a selected value to the fourth data to obtain second data, where the selected value is determined based on data in the first data sequence, and the second data sequence includes a plurality of pieces of the second data.

With reference to the first or the second possible implementation of the fifth aspect, in a third possible implementation of the fifth aspect, both the first random number sequence and the second random number sequence are uniformly distributed random number sequences.

With reference to the first possible implementation of the fifth aspect, in a fourth possible implementation of the fifth aspect, the obtaining the second data sequence based on a selected probability distribution function and the second random number sequence specifically includes: obtaining a value set of second data and an occurrence probability of each value in the value set based on the selected probability distribution function and a preset value range of the second data; and selecting a value of the second data from the value set based on a correspondence between a value represented by M second random numbers and a value in the value set, where the correspondence is set based on an occurrence probability of each value represented by the M second random numbers and the occurrence probability of each value in the value set, at least one value represented by the M second random numbers corresponds to a value in the value set, a sum of occurrence probabilities of the at least one value is the same as a sum of occurrence probabilities of corresponding values in the value set, and M is a positive integer.

With reference to any one of the fifth aspect or the first to the fourth possible implementations of the fifth aspect, in a fifth possible implementation of the fifth aspect, the modulating the first optical signal based on the first data sequence to output a second optical signal specifically includes: modulating the first optical signal based on the first data sequence to obtain the second optical signal, and attenuating strength of the second optical signal to be less than a first threshold to output the attenuated second optical signal, or attenuating strength of the first optical signal to be less than a second threshold, and modulating the attenuated first optical signal based on the first data sequence to output the second optical signal.

With reference to any one of the fifth aspect or the first to the fifth possible implementations of the fifth aspect, in a sixth possible implementation of the fifth aspect, the method further includes:

obtaining a covariance matrix $$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix}$$

based on the second data sequence and a third data sequence, where $\gamma_A$, $\varphi_{AC}$, and $\gamma_C$ are preset values, and $\varphi_{CB}$ is obtained based on the second data sequence and the third data sequence, $\gamma_B$ is obtained based on the third data sequence, a superscript T represents matrix transposition, and the third data sequence includes a random portion of data of a measurement value obtained after the second optical signal passes through an optical channel; and obtaining, based on the covariance matrix, a value of $\varphi_{AB}$ satisfying a first condition, where the first condition is: $\gamma_{ACB}+i\Omega_N \geq 0$, $\Omega_N$ is an N×N block matrix whose data on a diagonal is all $\Omega$, $$\Omega = \begin{pmatrix} 0 & 1 \\ -1 & 0 \end{pmatrix},$$

and N is a positive integer not less than 3; and calculating secure bit rate values corresponding to all values of $\varphi_{AB}$ satisfying the first condition, to obtain a CV-QKD secure bit rate, where the CV-QKD secure bit rate is a minimum value among the secure bit rate values.

According to a sixth aspect, a CV-QKD receiving method is provided. The method includes: receiving a second optical signal, and performing measurement and sampling processing on the second optical signal to obtain a fifth data sequence, where the second optical signal is sent by a sending device and includes n quantum states, and n is a positive integer not less than 8: receiving a sixth data sequence, where the sixth data sequence includes a random portion of data of a first data sequence of the sending device, the first data sequence is determined based on a preset quantity of modulation format symbols and a distribution probability of each symbol; and generating a seventh data sequence based on the sixth data sequence, where the sixth data sequence and the seventh data sequence are used for obtaining a secure bit rate.

With reference to the sixth aspect, in a first possible implementation of the sixth aspect, before the obtaining a seventh data sequence based on the sixth data sequence, the method further includes: generating a third random number sequence; and the obtaining a seventh data sequence based on the sixth data sequence specifically includes: obtaining the seventh data sequence based on a selected probability distribution function and the third random number sequence, where the selected probability distribution function is determined based on data in the sixth data sequence.

With reference to the sixth aspect, in a second possible implementation of the sixth aspect, before the obtaining a seventh data sequence based on the sixth data sequence, the method further includes: generating a third random number sequence; and the obtaining a seventh data sequence based on the sixth data sequence specifically includes: obtaining eighth data based on a preset probability distribution function and the obtained third random number sequence, and adding a selected value to the eighth data to obtain seventh data, where the selected value is determined based on data in the sixth data sequence, and the seventh data sequence includes a plurality of pieces of the seventh data.

With reference to the first or the second possible implementation of the sixth aspect, in a third possible implementation of the sixth aspect, the third random number sequence is a uniformly distributed random number sequence.

With reference to the first possible implementation of the sixth aspect, in a fourth possible implementation of the sixth aspect, the obtaining the seventh data sequence based on a selected probability distribution function and the obtained third random number sequence specifically includes: obtaining a value set of sixth data and an occurrence probability of each value in the value set based on the selected probability distribution function and a preset value range of the sixth data; and selecting a value of the seventh data from the value set based on a correspondence between a value represented by M third random numbers and a value in the value set, where the correspondence is set based on an occurrence probability of each value represented by the M third random numbers and the occurrence probability of each value in the value set, at least one value represented by the M third random numbers corresponds to a value in the value set, a sum of occurrence probabilities of the at least one value is the same as a sum of occurrence probabilities of corresponding values in the value set, and M is a positive integer.

With reference to any one of the sixth aspect or the first to the fourth possible implementations of the sixth aspect, in a fifth possible implementation of the sixth aspect, the method further includes:

obtaining a covariance matrix $$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix}$$

based on the seventh data sequence and the fifth data sequence, where $\gamma_A$, $\Omega_{AC}$, and $\gamma_C$ are preset values, and $\varphi_{CB}$ is obtained based on the seventh data sequence and the fifth data sequence, $\gamma_B$ is obtained based on the fifth data sequence, and a superscript T represents matrix transposition; and obtaining, based on the covariance matrix, a value of $\varphi_{AB}$ satisfying a first condition, where the first condition is: $\gamma_{ACB}+i\Omega_N \geq 0$, $\Omega_N$ is an N×N block matrix whose data on a diagonal is all $\Omega$, $$\Omega = \begin{pmatrix} 0 & 1 \\ -1 & 0 \end{pmatrix},$$

and N is a positive integer not less than 3: and calculating secure bit rate values corresponding to all values of $\varphi_{AB}$ satisfying the first condition, to obtain a CV-QKD secure bit rate, where the CV-QKD secure bit rate is a minimum value among the secure bit rate values.

According to a seventh aspect, a CV-QKD system is provided, including the sending device according to the eighth possible implementation of the first aspect and a receiving device, where the receiving device is configured to: receive a third optical signal: perform measurement and sampling processing on the third optical signal to obtain a fifth data sequence, where the third optical signal is a signal obtained after the second optical signal passes through an optical channel; perform random sampling on the fifth data sequence to obtain the third data sequence; and send the third data sequence to the sending device; or including the sending device according to any one of the first aspect or the first to the seventh possible implementations of the first aspect and the receiving device according to the fourth aspect, where the sending device further includes a transmitter, where the transmitter is configured to send the ninth data sequence to the receiving device, and the ninth data sequence includes a random portion of data of the second data sequence; or including the sending device according to the third aspect and the receiving device according to any one of the second aspect or the first to fifth possible implementations of the second aspect, where the receiving device is further configured to perform random sampling on the fifth data sequence and the seventh data sequence to obtain the third data sequence and the tenth data sequence, respectively, and send the third data sequence and the tenth data sequence to the sending device; or including a sending device and the receiving device according to the sixth possible implementation of the second aspect, where the sending device includes a light source, a modulation unit, a first random number generator, a processor, and a transmitter, where the light source is configured to generate a first optical signal; the first random number generator is configured to generate a first random number sequence; the processor is configured to: receive the first random number sequence, and obtain a first data sequence based on a preset quantity of modulation format symbols, a distribution probability of each symbol, and the first random number sequence, where the first data sequence is used for obtaining a secure bit rate: the modulation unit is configured to: receive the first optical signal, and modulate the first optical signal based on a control signal to output a second optical signal, where the control signal is generated based on the first data sequence, the second optical signal includes n quantum states, and n is a positive integer not less than 8; and the transmitter is configured to send a sixth data sequence to the receiving device, where the sixth data sequence includes a random portion of data in the first data sequence.

According to an eighth aspect, a secure bit rate calculation method is provided. The method includes: obtaining a covariance matrix $$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix}$$

based on a second data sequence and a third data sequence, where $\gamma_A$, $\varphi_{AC}$, and $\gamma_C$ are preset values, $\varphi_{CB}$ is obtained based on the second data sequence and the third data sequence, $\gamma_B$ is obtained based on the third data sequence, and a superscript T represents matrix transposition; the second data sequence is determined based on a first data sequence, a determining manner may be any one of the manners disclosed in the previous embodiments, and the first data sequence is determined based on a preset quantity of modulation format symbols and a distribution probability of each symbol; and the third data sequence is a random portion of data of a measurement value obtained after an optical signal sent by a CV-QKD sending device passes through an optical channel:

obtaining, based on the covariance matrix, a value of AB satisfying a first condition, where the first condition is: $\gamma_{ACB} + i\Omega_N \geq 0$, $\Omega_N$ is an N×N block matrix whose data on a diagonal is all $\Omega$, $$\Omega = \begin{pmatrix} 0 & 1 \\ -1 & 0 \end{pmatrix},$$

and N is a positive integer not less than 3: and calculating secure bit rate values corresponding to all values of $\varphi_{AB}$ satisfying the first condition, to obtain a CV-QKD secure bit rate, where the CV-QKD secure bit rate is a minimum value among the secure bit rate values.

With reference to the eighth aspect, in a first possible implementation of the eighth aspect, the secure bit rate calculation method may be applied to a CV-QKD sending device, or may be applied to a CV-QKD receiving device.

According to a ninth aspect, a data sequence obtaining method applied to a CV-QKD system is provided. The method includes: generating a first random number sequence and a second random number sequence: obtaining a first data sequence based on the first random number sequence, a preset value, and a distribution probability of the preset value; and obtaining a second data sequence based on a selected probability distribution function and the second random number sequence, where the selected probability distribution function is determined based on data in the first data sequence.

With reference to the ninth aspect, in a first possible implementation of the ninth aspect, the obtaining a second data sequence based on a selected probability distribution function and the second random number sequence specifically includes: obtaining a value set of second data and an occurrence probability of each value in the value set based on the selected probability distribution function and a preset value range of the second data; and selecting a value of the second data from the value set based on a correspondence between a value represented by M second random numbers and a value in the value set, where the correspondence is set based on an occurrence probability of each value represented by the M second random numbers and the occurrence probability of each value in the value set, at least one value represented by the M second random numbers corresponds to a value in the value set, a sum of occurrence probabilities of the at least one value is the same as a sum of occurrence probabilities of corresponding values in the value set, and M is a positive integer.

With reference to the ninth aspect or the first possible implementation of the ninth aspect, in a second possible implementation of the ninth aspect, both the first random number sequence and the second random number sequence are uniformly distributed random number sequences.

According to a tenth aspect, a data sequence obtaining method applied to a CV-QKD system is provided. The method includes: generating a first random number sequence and a second random number sequence: obtaining a first data sequence based on the first random number sequence, a preset value, and a distribution probability of the preset value; and obtaining fourth data based on a preset probability distribution function and the obtained second random number sequence, and adding a selected value to the fourth data to obtain second data, where the selected value is determined based on data in the first data sequence, and the second data sequence includes a plurality of pieces of the second data.

According to an eleventh aspect, a computer storage medium is provided. The computer storage medium is configured to store a computer software instruction that implements the secure bit rate calculation method according to the eighth aspect, where the computer software instruction includes a program designed for performing the foregoing method. A CV-QKD secure bit rate calculation method provided in the embodiments of this application can be implemented by executing the stored program.

According to a twelfth aspect, a computer storage medium is provided. The computer storage medium is configured to store a computer software instruction that implements the data sequence obtaining method according to any one of the ninth or tenth aspect or the possible implementations of the ninth aspect, where the computer software instruction includes a program designed for performing the foregoing method. The data sequence obtaining method that is applied to a CV-QKD system and that is provided in the embodiments of this application can be implemented by executing the stored program.

In the embodiment of this application, the second data sequence is introduced, thereby reducing a quantity of quantum states of an output optical signal and further reducing implementation difficulty. It should be noted that the CV-QKD devices disclosed in the embodiments of this application provide strict provable security and satisfy requirements of the industry.

DESCRIPTION OF EMBODIMENTS

The following describes technical solutions in the embodiments of this application with reference to accompanying drawings in the embodiments of this application.

In a CV-QKD system, a CV-QKD protocol needs to contain two equivalent models. One is a prepare-and-measure (PM) model. The PM model usually does not require use of an entanglement source, and therefore, is easy to implement and is often used as a model executed by an actual system. The other is an entanglement-based (EB) model. The EB model uses an entanglement source, and therefore greatly facilitates provable security. However, it is precisely because a current entanglement source manufacturing technique is not practical enough, so the EB model is more difficult to implement in the actual system. Therefore, when the CV-QKD protocol is designed, to implement a commercially available system by using an existing technique while ensuring security, a pair of mutually equivalent PM and EB models are usually designed. In this way, the EB model can be used to prove security, and the PM model can be used to specifically manufacture a practical system.

Figure 1:
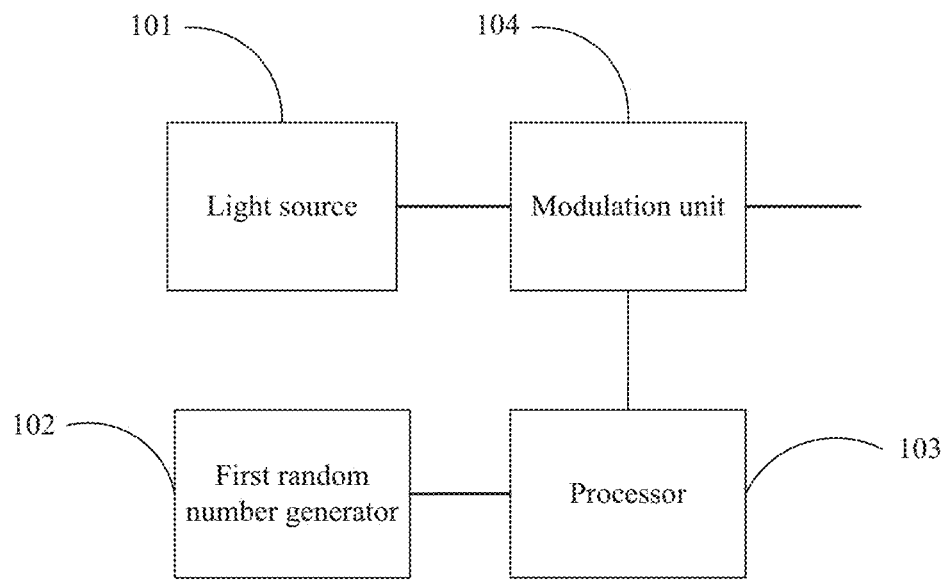
FIG. 1 shows a CV-QKD sending device according to an embodiment of this application.

Any practical CV-QKD system should have the EB model and the PM model that are mutually equivalent. Only the EB model is difficult to implement; and security cannot be guaranteed if there is only the PM model. To resolve a problem that an existing CV-QKD device has quite large difficulty in modulation while ensuring security, the embodiments of this application propose a CV-QKD system providing strict provable security. To be specific, the CV-QKD system (the PM model) has an equivalent EB model, and can provide strict provable security. A sending device of the system is shown in FIG. 1, and includes a light source 101, a modulation unit 104, a first random number generator 102, and a processor 103.

The light source 101 is configured to generate a first optical signal. The first random number generator 102 is configured to generate a first random number sequence. The processor 103 is configured to: receive the first random number sequence, obtain a first data sequence based on a preset quantity of modulation format symbols, a distribution probability of each symbol, and the first random number sequence, and obtain a second data sequence based on the first data sequence, where the first data sequence and the second data sequence are used for obtaining a secure bit rate. The modulation unit 104 is configured to receive the first optical signal, and modulate the first optical signal based on a control signal to output a second optical signal, where the control signal is generated based on the first data sequence, the second optical signal includes n quantum states, and n is a positive integer not less than 8.

Both the quantity of modulation format symbols and the distribution probability of each symbol are preset. Based on the two pieces of preset information and the first random number sequence, the first data sequence can be generated. Specifically, the following manner may be used.

First, the quantity of modulation format symbols and the distribution probability of each symbol are known, each symbol corresponds to a quantum state of the output second optical signal, and a function of the first data sequence is used to modulate the first optical signal to generate the second optical signal. Therefore, each piece of data in the first data sequence may be considered as a quantum state corresponding to the second optical signal. That is, the data in the first data sequence is in a one-to-one correspondence with the preset modulation format symbols. In other words, possible values of the data in the first data sequence and a distribution probability of each value are also known.

Second, a specific symbol modulated at each different moment is uncertain, and is related to the distribution probability of each symbol. For example, assuming that a modulation format is 256-bit quadrature amplitude modulation (256QAM), a distribution probability of the $15^{th}$ symbol is 1%, and a distribution probability of the $30^{th}$ symbol is 5%, there is a probability of 1% that a specific symbol modulated at a current moment is the $15^{th}$ symbol, and there is a probability of 5% that a specific symbol modulated at a current moment is the $30^{th}$ symbol. Therefore, the first random number sequence is required to help determine the first data sequence. The first data sequence can be obtained based on a value represented by each L random numbers in the first random number sequence and a preset correspondence between the value and the data in the first data sequence. The correspondence is set based on an occurrence probability of each value presented by the L first random numbers and the distribution probability of each symbol, and at least one value represented by the L first random numbers corresponds to one symbol.

For example, assuming that L=20, there are the $20^{th}$ power of 2 (1048576) possible values for 20 random numbers. An occurrence probability of each value is 1/1048576, and a sum of occurrence probabilities of about 10486 possible values is 1/%. Specific 10486 possible values may be preset to correspond to the $15^{th}$ symbol. Provided that values of the 20 random numbers are among the 10486 possible values, it can be learned that the specific symbol modulated at the current moment corresponds to the $15^{th}$ symbol, and then a current value of the first data sequence is further determined. By analogy, correspondences between possible values of a random number sequence and different symbols may be preset, and then the first data sequence can be obtained based on the random number sequence.

The random number sequence in the foregoing example is a uniformly distributed random number sequence. This is an optional solution. In addition, the random number sequence may also be a non-uniform random number sequence such as a random number sequence satisfying Gaussian distribution. Likewise, 20 random numbers may be selected to correspond to one symbol. A difference lies in that occurrence probabilities of all possible values are no longer the same. There may be a case in which a sum of occurrence probabilities of specific 5000 possible values or specific 7000 possible values is equal to 1%. In this case, the 5000 possible values or the 7000 possible values may be preset to correspond to the $15^{th}$ symbol, and remaining steps are unchanged.

It should be noted that the foregoing solution is merely a feasible manner of generating the first data sequence based on the quantity of modulation format symbols and the distribution probability of each symbol, and the first data sequence may be generated by using an algorithm or in any other feasible manner. A specific manner of generating the first data sequence is not limited herein in this application.

In this embodiment of this application, after the first data sequence is obtained, the second data sequence needs to be obtained based on the sequence. The second data sequence is used for obtaining a secure bit rate, and is also one of keys to implementation of provable security in this embodiment of this application through its equivalent EB. The second data sequence may be obtained in the following several manners.

(1) The second data sequence is obtained based on a selected probability distribution function and an obtained second random number sequence, where the selected probability distribution function is determined based on the data in the first data sequence.

Specifically, each piece of data in the first data sequence corresponds to a probability distribution function. If a value of the first data sequence is determined at a current moment, a probability distribution function corresponding to the value is the selected probability distribution function. It should be noted that two different pieces of data in the first data sequence may correspond to a same probability distribution function, or may correspond to different probability distribution functions.

A value set of second data and an occurrence probability of each value in the value set are obtained based on the selected probability distribution function and a preset value range of the second data. For example, it is assumed that a value of the second data ranges from −10 to +10. Because an actual system cannot implement sampling with infinite precision on any continuous data, discretization needs to be performed on the value of the second data. For the sake of simplicity, assuming that the second data is an integer within −10 to +10, the value set of the second data is {−10, −9, −8, . . . , +9, +10}. Because the probability distribution function has been selected, the occurrence probability of each value in the value set can be determined. If the probability distribution function is a uniformly distributed function, the occurrence probability of each value is 1/21; or if the probability distribution function is not a uniformly distributed function, each value has its own occurrence probability.

Further, the value of the second data is selected from the value set based on a correspondence between a value represented by each M second random numbers in the second random number sequence and a value in the value set, where the preset correspondence is set based on an occurrence probability of each value represented by the M second random numbers and the occurrence probability of each value in the value set, at least one value represented by the M second random numbers corresponds to a value in the value set, and M is a positive integer.

In short, assuming that M=20, there are also the $20^{th}$ power of 2 (1048576) possible values for the 20 second random number. An occurrence probability of each value is 1/1048576, a sum of occurrence probabilities of about 10486 possible values is 1%, and a sum of occurrence probabilities of about 104857 possible values is 10%. In a probability distribution function at a current moment, if a probability of −10 is 1% and a probability of +10 is 10%, specific 10486 possible values may be set to correspond to −10, provided that values of the 20 random numbers are among the 10486 possible values, and it can be learned that the value of the second data is −10. Among remaining possible values, specific 104857 possible values may also be set to correspond to +10, provided that values of the 20 random numbers are among the 104857 possible values, and it can be learned that the value of the second data is +10. The foregoing correspondence is preset, provided that possible values of the 20 random numbers do not simultaneously correspond to two different pieces of data. Therefore, the second data sequence can be determined based on a value of each M numbers in the second random number sequence.

It should be understood that for each selected probability distribution function, there is a correspondence similar to the correspondence in the foregoing example. According to these correspondences, the second data sequence can be generated based on the second random number sequence. If possible values of the M second random numbers are less than values in the value set, it is possible to never obtain a specific value in the value set. This does not meet a requirement. If there are more possible values of the M second random numbers, a probability distribution function of the obtained second data sequence is closer to a theoretical requirement, and performance is better.

Optionally, the second random number sequence in the foregoing example may also be a non-uniformly distributed random number sequence such as a random number sequence satisfying Gaussian distribution. Specifically, the second random number sequence may be generated by a new random number generator, or may be generated by the existing first random number generator in a time division multiplexing manner or another multiplexing manner, provided that the first random number sequence and the second random number sequence are different.

(2) Fourth data is obtained based on a preset probability distribution function and an obtained second random number sequence, and a selected value is added to the fourth data to obtain second data, where the selected value is determined based on the data in the first data sequence, and the second data sequence includes a plurality of pieces of the second data.

In this solution, the probability distribution function is preset and does not change, and therefore there is no need to determine a current probability distribution function. A manner of obtaining the fourth data is the same as a manner of obtaining the second data in solution (1) if a preset probability distribution function is selected. A specific implementation has been provided above, and details are not described herein again in this embodiment.

After the fourth data is obtained, a value further needs to be added to obtain the second data. Added values are collectively referred to as Z, and Z is related to the first data sequence and may be a positive number or a negative number. Specifically, each piece of data in the first data sequence corresponds to a Z value, and two different pieces of data in the first data sequence may correspond to a same Z value, or may correspond to different Z values. If a value of the first data sequence at a current moment is determined, a Z value corresponding to the value is the selected value. For example, according to a manner of calculating a value of the second data in solution (1), if it is obtained, based on M random numbers in the second random number sequence, that a value of the fourth data is 10, and a selected value corresponding to data in the first data sequence at this moment is 1, it can be obtained that the value of the second data is 11; and at a next moment, if it is obtained, based on subsequent M random numbers in the second random number sequence, that the value of the fourth data is 8, and a selected value corresponding to data in the first data sequence at this moment is −2, the value of the second data is 6. By analogy, the second data sequence can be obtained.

Optionally, the second random number sequence in the foregoing example may alternatively be a non-uniformly distributed random number sequence such as a random number sequence satisfying Gaussian distribution. Specifically, the second random number sequence may be generated by a new random number generator, or may be generated by the existing first random number generator in a time division multiplexing manner or another multiplexing manner, provided that the first random number sequence and the second random number sequence are different.

(3) Each piece of data in the first data sequence corresponds to a preset value, and the second data sequence includes a plurality of the preset values. For example, it is assumed that when the data in the first data sequence is 1, a corresponding preset value is 3, and when the data in the first data sequence is 5, a corresponding preset value is 10. In this case, if the data in the first data sequence is 1, data in the second data sequence is determined as 3: and if the data in the first data sequence is 5, the data in the second data sequence is determined as 10. Therefore, the second data sequence can also be obtained with no need to introduce a new random number sequence. Because a quantum state of the output second optical signal is determined based on the first data sequence and is not related to the second data sequence, when a secure bit rate is calculated, an average value of the selected probability distribution function in the manner (1) may be directly used, and the average value is the preset value.

It should be noted that in a most rigorous theory, a random number generator is required to generate a true random number, and in actual application, a quantum random number generated by a random number generator that is designed based on intrinsic randomness of quantum mechanics is closest to the true random number, and this random number generator may be used as the first random number generator and the second random number generator in this application. In addition, in a system that does not have a relatively high requirement, or in a case in which there is a restriction on an attack means of an eavesdropper, the first random number generator and the second random number generator in this application may alternatively be a random number generator that generates a random number based on an algorithm or a classical random phenomenon.

It should be noted that the first optical signal may be a continuous optical signal or a pulse optical signal, and there are a plurality of solutions to implement both a light source that generates the continuous optical signal and a light source that generates the pulse optical signal. This is not limited in this embodiment of this application.

Figure 2A:
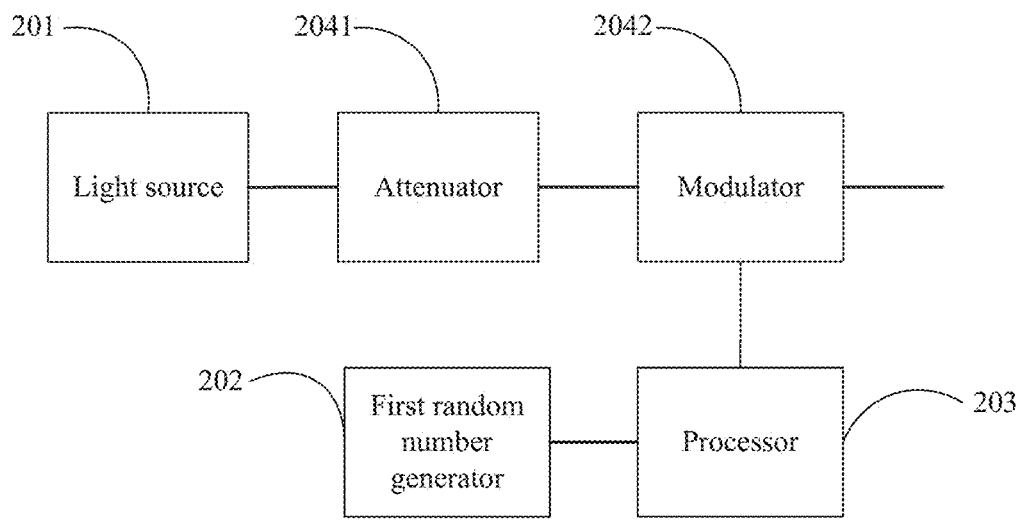
FIG. 2(a) shows a CV-QKD sending device according to another embodiment of this application.
Figure 2B:
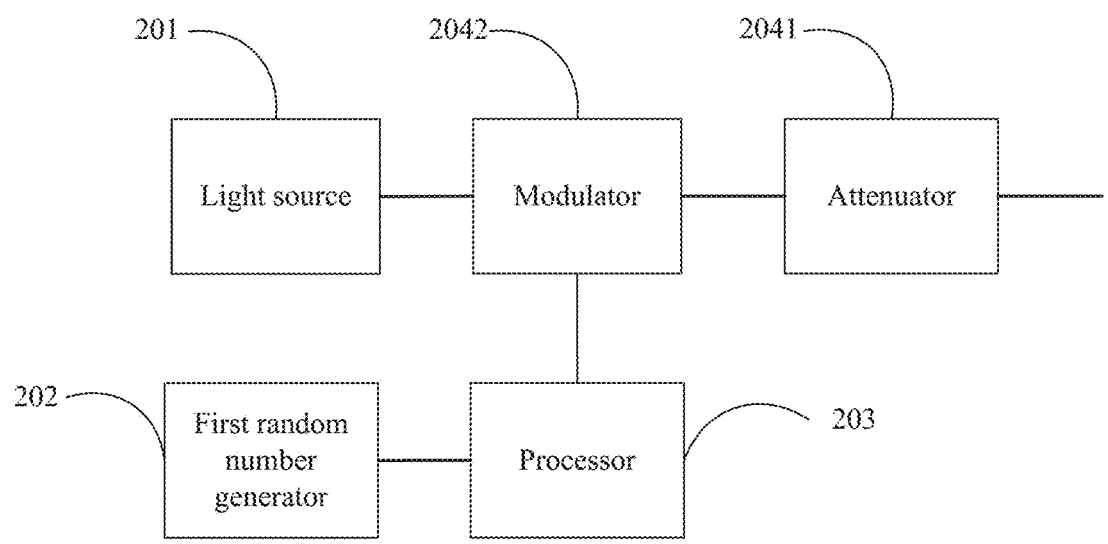
FIG. 2(b) shows a CV-QKD sending device according to another embodiment of this application.

In this embodiment of this application, the modulation unit 104 includes a modulator 2042 and an attenuator 2041, and structures are shown in FIG. 2(*a*) and FIG. 2(*b*). The attenuator 2041 may be disposed behind the modulator 2042, or may be disposed between the light source 201 and the modulator 2042. If the attenuator 2041 is disposed behind the modulator 2042, the modulator 2042 is configured to receive the first optical signal emitted by the light source 201, and modulate the first optical signal based on the control signal to output the second optical signal to the attenuator 2041, where the control signal is generated based on the first data sequence; and the attenuator 2041 is configured to attenuate strength of the second optical signal to be less than a first threshold to output the attenuated second optical signal. If the attenuator 2041 is disposed between the light source 201 and the modulator 2042, the attenuator 2041 is configured to: receive the first optical signal emitted by the light source 201, attenuate strength of the first optical signal to be less than a second threshold, and send the attenuated first optical signal to the modulator 2042; and the modulator 2042 is configured to modulate the attenuated first optical signal based on the control signal to output the second optical signal, where the control signal is generated based on the first data sequence. Optionally, in terms of optical power, a difference between the first threshold and the second threshold is equal to an attenuation value of the modulator.

Optionally, the processor 203 may output the first data sequence to the modulation unit 104, and another processor existing in the modulation unit 104 identifies the first data sequence, and converts the first data sequence into the control signal; or the processor 203 may convert the first data sequence into the control signal, and output the control signal to the modulator 2042 in the modulation unit.

Figure 3:
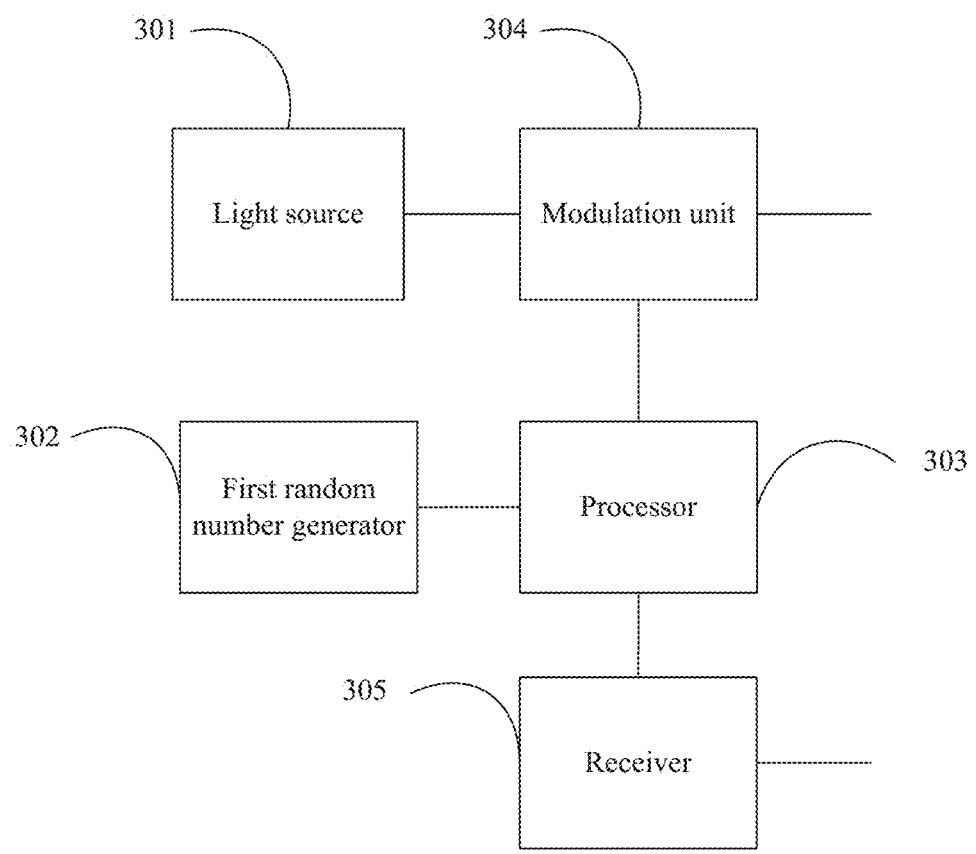
FIG. 3 shows a CV-QKD sending device according to another embodiment of this application.

Further, in a process of calculating a secure bit rate, in addition to the second data sequence, data measured by a receiving device after the output second optical signal passes through an optical channel is also needed. Therefore, the sending device of the CV-QKD system further includes a receiver 305, as shown in FIG. 3. The receiver 305 is configured to receive a third data sequence, where the third data sequence includes a random portion of data of a measurement value obtained after the second optical signal passes through the optical channel. The secure bit rate may be calculated in the following manner:

A covariance matrix is obtained based on the second data sequence and the third data sequence:

$$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix},$$

where $\gamma_A$, $\varphi_{AC}$, and $\gamma_C$ are preset values, $\varphi_{CB}$ is obtained based on the second data sequence and the third data sequence, $\gamma_B$ is obtained based on the third data sequence, and a superscript T represents matrix transposition; and if each item in the covariance matrix is known, the secure bit rate can be calculated directly. Because a submatrix $\varphi_{AB}$ in the foregoing covariance matrix is completely unknown, a traversal search is required.

A value of $\varphi_{AB}$ satisfying a first condition is obtained based on the covariance matrix, where the first condition is: $\gamma_{ACB} + i\Omega_N \geq 0$, $\Omega_N$ is an N×N block matrix whose data on a diagonal is all $\Omega$, $$\Omega = \begin{pmatrix} 0 & 1 \\ -1 & 0 \end{pmatrix},$$

and N is a positive integer not less than 3.

All values of $\varphi_{AB}$ satisfying the first condition are obtained. Each obtained value of $\varphi_{AB}$ is substituted into a secure bit rate calculation formula to obtain a corresponding secure bit rate value, and a smallest one is selected from obtained secure bit rate values as a secure bit rate of the CV-QKD system.

It should be understood that, to obtain a quantum key, processing such as comparison and screening, error correction, and private key amplification is further included, but these steps are all existing techniques, and there are a plurality of implementations. Therefore, these steps are not limited in this embodiment of this application.

In this embodiment of this application, the second data sequence is introduced, thereby reducing a quantity of quantum states of an output optical signal on a basis of ensuring security and performance and therefore reducing implementation difficulty. In an existing coherent state Gaussian modulation model, even if approximation processing is performed, a quantity of quantum states of an output optical signal also needs to reach an order of magnitude of $2^8 \times 2^8$. However, in this embodiment of this application, the quantity n of the quantum states of the output optical signal only needs to satisfy: $2^8 \times 2^8 > n \geq 8$, for example, n=64 or 256. This greatly reduces implementation difficulty.

It should be noted that, when $8 > n \geq 2$, the solution in this embodiment of this application can also be operated, but an obtained secure bit rate is relatively low. If there is a short distance between a sending device and a receiving device, for example, a distance of several kilometers, this embodiment of this application can be operated, provided that $n \geq 2$.

Figure 4:
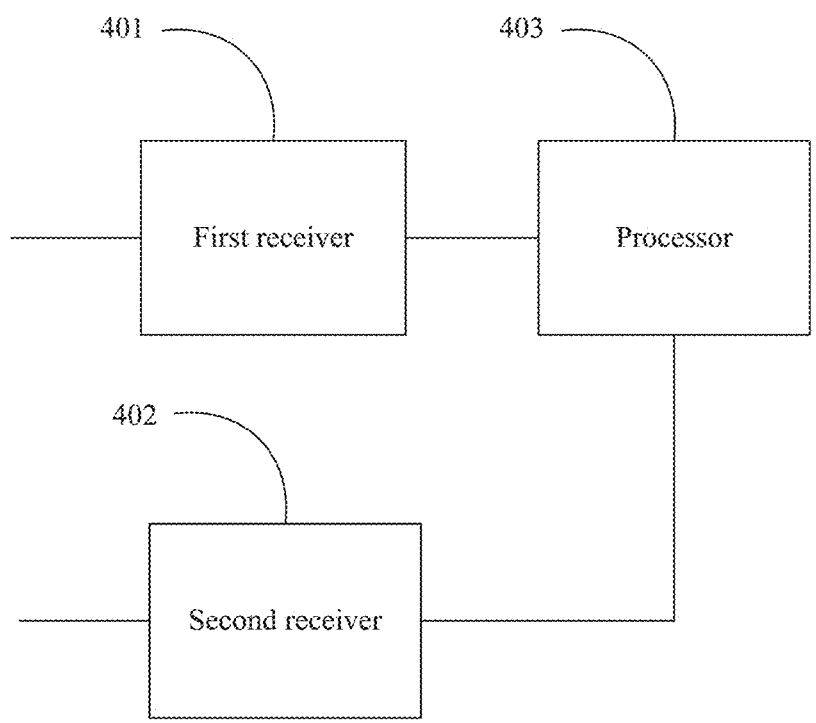
FIG. 4 shows a CV-QKD receiving device according to another embodiment of this application.

Another embodiment of this application further provides a receiving device of a CV-QKD system. As shown in FIG. 4, the receiving device of the CV-QKD system includes a first receiver 401, a second receiver 402, and a processor 403.

The first receiver 401 is configured to receive a third optical signal, and perform measurement and sampling processing on the third optical signal to obtain a third data sequence, where the third optical signal is sent by a sending device and includes n quantum states, n is a positive integer not less than 8, and the third data sequence is used for obtaining a secure bit rate.

It should be noted that the third optical signal is a signal obtained after a second optical signal output by the sending device passes through an optical channel. Due to some interference in the optical channel, signal quality of the third optical signal is somewhat deteriorated compared to that of the second optical signal.

The second receiver 402 is configured to receive a sixth data sequence, where the sixth data sequence includes a random portion of data of a first data sequence of the sending device, and the first data sequence is determined based on a preset quantity of modulation format symbols and a distribution probability of each symbol.

The processor 403 is configured to generate a seventh data sequence based on the sixth data sequence, where the seventh data sequence is used for obtaining a secure bit rate.

In this embodiment, solutions of generating the seventh data sequence include: (1) obtaining the seventh data sequence based on a selected probability distribution function and an obtained third random number sequence, where the selected probability distribution function is determined based on data in the sixth data sequence; (2) obtaining eighth data based on a preset probability distribution function and an obtained third random number sequence, and adding a selected value to the eighth data to obtain seventh data, where the selected value is determined based on data in the sixth data sequence, and the seventh data sequence includes a plurality of pieces of the seventh data; and (3) each piece of data in the sixth data sequence corresponds to a preset value, the seventh data sequence includes a plurality of the preset values, and therefore a new random number sequence does not need to be introduced. Specific implementations of the foregoing solutions of generating the seventh data sequence have been described in detail in the sending device embodiment, and details are not described herein again.

Optionally, the third random number sequence in this embodiment may alternatively be a non-uniformly distributed random number sequence such as a random number sequence satisfying Gaussian distribution. Specifically, the third random number sequence may be generated by a new random number generator.

Optionally, the processor 403 is further configured to obtain a covariance matrix $\gamma_{ACB}$ based on the seventh data sequence and a fifth data sequence, and calculate a secure bit rate of the CV-QKD system by using $\gamma_{ACB}$. A specific manner of calculating a secure bit rate has been described in detail in the foregoing embodiment, and details are not described herein again.

Another embodiment of this application further provides a sending device of a CV-QKD system, and a structure is still shown in FIG. 3. The sending device includes a light source 301, a modulation unit 304, a first random number generator 302, a processor 303, and a receiver 305.

The light source 301 is configured to generate a first optical signal. The first random number generator 302 is configured to generate a first random number sequence. The processor 303 is configured to: receive the first random number sequence, obtain a first data sequence based on a preset quantity of modulation format symbols, a distribution probability of each symbol, and the first random number sequence, where the first data sequence is used for obtaining a secure bit rate. The modulation unit 304 is configured to receive the first optical signal, and modulate the first optical signal based on a control signal to output a second data signal, where the control signal is generated based on the first data sequence, the second optical signal includes n quantum states, and n is a positive integer not less than 8. The receiver 305 is configured to receive a third data sequence and a tenth data sequence from a receiving device, where the third data sequence includes a random portion of data of a measurement value obtained after the second optical signal passes through an optical channel, and the tenth data sequence is used for obtaining a secure bit rate. The processor is further configured to calculate a secure bit rate based on the tenth data sequence and the third data sequence.

Another embodiment of this application further provides a receiving device of a CV-QKD system, and a structure is still shown in FIG. 4. The receiving device includes a first receiver 401, a second receiver 402, and a processor 403.

The first receiver 401 is configured to receive a third optical signal, and perform measurement and sampling processing on the third optical signal to obtain a fifth data sequence, where the third optical signal is sent by a sending device and includes n quantum states, and n is a positive integer not less than 8. The second receiver 402 is configured to receive a ninth data sequence, where the ninth data sequence includes a random portion of data of a second data sequence of the sending device, and the second data sequence is determined based on a first data sequence. The processor 403 is configured to calculate a secure bit rate based on the ninth data sequence and the fifth data sequence.

It should be noted that a process of obtaining a second data sequence (called a seventh data sequence in the receiving device) may be performed at the sending device or at the receiving device; and likewise, a process of calculating a secure bit rate may be performed at the sending device or at the receiving device. This is not limited in this application. To be specific, assuming that the process of obtaining a second data sequence is denoted as T1 and the process of calculating a secure bit rate is denoted as T2, the embodiments of this application provide four different CV-QKD systems, including: (1) a sending device that performs T1 and T2 and a receiving device that is the same as that in the prior art; (2) a sending device that performs T1 and a receiving device that performs T2; (3) a sending device that performs T2 and a receiving device that performs T1: and (4) a sending device that is the same as that in the prior art and a receiving device that performs T1 and T2. Execution processes of both T1 and T2 are described in detail in the foregoing embodiments, and details are not described herein again.

The foregoing embodiments describe actual CV-QKD systems, which are equivalent to a PM model in a CV-QKD protocol framework. To prove security of the PM model, this application further proposes an EB model that is equivalent to the PM model. On a basis of this equivalent EB model, a secure bit rate calculation method can be obtained, so that the foregoing embodiments can be better understood. The following describes a design idea and a specific example of the equivalent EB model.

Figure 5:
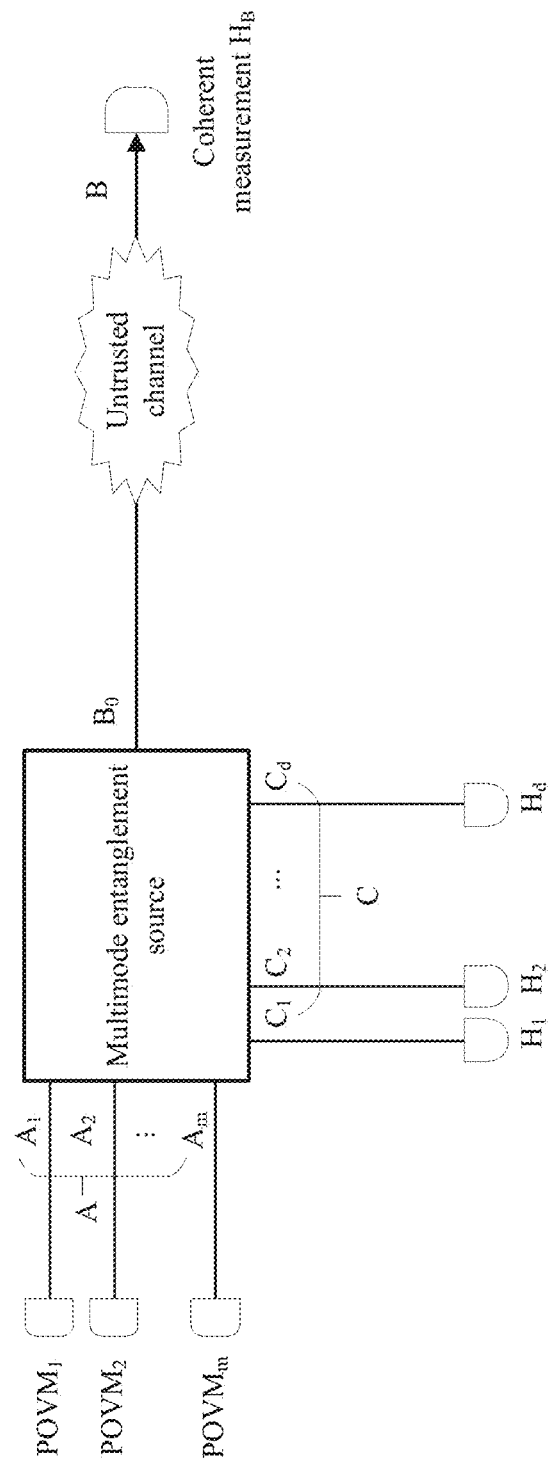
FIG. 5 shows a provable security model according to another embodiment of this application.

As shown in FIG. 5, a sending device uses a multimode entanglement state as a source, and performs positive-operator valued measurements (POVM) (denoted as POVM$_i$ in the figure) on m modes A$_1$ to A$_m$ in addition to a coherent measurement, and performs coherent measurements (denoted as H$_i$ in the figure) on d modes C$_1$ to C$_d$. These measurements project a mode B$_0$ onto a coherent state in a quantum state set and send the coherent state into an untrusted channel. After the coherent state passes through the channel, the mode B$_0$ is denoted as a mode B at a receiving device, and the receiving device performs a coherent measurement H$_B$ on the mode B, where m≥1, d≥1, m+d+1=n. Furthermore, the m POVM measurements may be different or the same.

Optionally, for the POVM measurements performed on the m modes A$_1$ to A$_m$, there may be one measurement for each mode, and in this case, there are a total of m measurements; or one measurement may correspond to a plurality of modes, and in this case, a quantity of POVM measurements is less than m. For the coherent measurements performed on the d modes C$_1$ to C$_d$, there may be one measurement for each mode, and in this case, there are a total of d measurements; or one measurement may correspond to a plurality of modes, and in this case, a quantity of measurements performed by the sending device is less than d. A quantum state sent into the untrusted channel may be either one mode B$_0$ or l modes B$_1$ to B$_l$, and in this case, a quantity of modes needs to satisfy l≥1, m≥1, d≥1, m+d+l=n. All B$_i$ modes may be l coherent states, or may be I other quantum states. This is not limited in this application.

In the EB model shown in FIG. 5, the entanglement source may be in any physical state, provided that a physical entity carrying the mode B can be sent to the receiving device. However, in actual application, an optical quantum state is a most common choice because the optical quantum state is easy to be transmitted through an optical fiber or a spatial channel, and features high practicality. In quantum physics, each mode of the optical quantum state corresponds to a pair of generation and annihilation operators, a symbol is denoted as â, â†, and a pair of regular components (quadrature) x̂, p̂ may be defined based on the generation and annihilation operators. This application adopts definitions consistent with the reference Rev. Mod. Phys. 84, 621 (2012). In particular, a definition of the regular component is consistent with Formula (6) in the reference.

In a CV-QKD protocol, a covariance matrix is an important basis for calculating a secure bit rate, where a definition of a covariance matrix of the optical quantum state is consistent with Formula (15) in the foregoing reference. It should be pointed out that due to a difference in dimension selection, the regular component and the covariance matrix may use different definition manners, but corresponding physical essence is equivalent to definition manners in the reference selected in this application.

For the EB model shown in FIG. 5, with respect to an overall quantum state $\rho_{ACB}$ (where a subscript A represents the m modes A$_1$ to A$_m$, a subscript C represents the d modes C$_1$ to C$_d$, and a subscript B represents the l modes B$_1$ to B$_l$) that passes through the untrusted channel, ordinal positions of the modes are sequentially defined as: A$_1$ A$_2$ ... A$_m$ C$_1$ C$_2$ ... C$_d$ B$_1$ B$_2$ ... B$_l$. In this case, its covariance matrix may be obtained, and may be expressed as the following in block matrix representation:

$$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix},$$

where a superscript T represents matrix transposition; $\gamma_A$ is a 2m×2m submatrix, representing a sub-covariance matrix of the m modes $A_1$ to $A_m$; $\gamma_C$ is a 2d×2d submatrix, representing a sub-covariance matrix of the d modes $C_1$ to $C_d$; and $\gamma_B$ is a 2l×2l submatrix, representing a sub-covariance matrix of the l modes $B_1$ to $B_l$. $\phi_{AC}$, $\phi_{AB}$, $\phi_{BC}$ are 2m×2d, 2m×2l, and 2d×2l submatrices, respectively.

The following describes, by using reverse negotiation as an example, how to calculate a secure bit rate in the EB model. Reverse negotiation means that by using data of the receiving device as a reference, the sending device processes, by using a processing step such as error correction, data of the sending device into a data sequence that is the same as the data of the receiving device. Therefore, a key point to obtain a secure bit rate is to calculate an amount of information that an eavesdropper has about a measurement result of the receiving device. The covariance matrix may provide an upper bound of the amount of information that the eavesdropper steals. Therefore, it may be considered that the covariance matrix determines calculation of the secure bit rate. To be specific, the secure bit rate K is a function of the covariance matrix, and may be expressed as:

$$K = f(\gamma_{ACB}), \text{ where}$$

f represents a mapping relationship, and the mapping relationship is related to a measurement method that is specifically performed by the receiving device, and is also related to a quantity of modes, and has a plurality of expression forms. A specific form of the mapping relationship is not limited in this application.

Because it needs to be ensured that a CV-QKD system is secure in any channel, a secure bit rate calculation method should not contain any assumption about the channel. In other words, obtaining the covariance matrix should not depend on any channel assumption. For items in $\gamma_{ACB}$, an obtaining manner is: (1) Because both the modes $A_1$ to $A_m$ and the modes $C_1$ to $C_d$ do not pass through a channel, and the quantum state $\rho_{ACB}$ is designed in the CV-QKD protocol, all the three submatrices $\gamma_A$, $\gamma_C$, and $\phi_{AC}$ may be directly calculated. In addition, $\gamma_C$ may also be obtained through statistics collection performed on results of the coherent measurements performed on the modes $C_1$ to $C_d$, (2) because both measurements performed by a receiver on the modes $B_1$ to $B_l$ and measurements performed by the sending device on the modes $C_1$ to $C_d$ are coherent measurements, $\gamma_B$ and $\phi_{BC}$ may be obtained through comparison and statistics collection performed on results of these coherent measurements; and (3) because measurements performed on the modes $A_1$ to $A_m$ are not coherent measurements, and the modes $B_1$ to $B_l$ become unknown after passing through the untrusted channel, $\phi_{AB}$ cannot be obtained. In other words, the covariance matrix $\gamma_{ACB}$ is incomplete, and there is an unknown item.

A set of all possible $\phi_{AB}$ is denoted as S1. Because a channel eavesdropper can only perform an attack conforming to laws of physics, a final covariance matrix of the quantum state $\rho_{ACB}$ should satisfy a physical condition limit. Specifically, the following formula is a necessary condition that should be met by $\gamma_{ACB}$ conforming to the laws of physics:

$$\gamma_{ACB} + i\Omega_n \geq 0, \text{ where}$$

a matrix greater than or equal to 0 means that the matrix is semi-positive; a definition of $\Omega_n$ is the same as that in Formula (2) in the foregoing reference, and $\Omega_n$ is a block diagonal matrix using k 2×2 matrices $\Omega$ as a diagonal element, that is, a 2k×2k matrix, $$\Omega_n = \bigoplus_{k=1}^{n} \Omega = \begin{pmatrix} \Omega & & \\ & \ddots & \\ & & \Omega \end{pmatrix}, \Omega = \begin{pmatrix} 0 & 1 \\ -1 & 0 \end{pmatrix}.$$

Under the foregoing physical constraints, the set S represents a set of all values of $\phi_{AB}$ that can satisfy a condition $\gamma_{ACB} + i\Omega_n \geq 0$.

Assuming that $\kappa_{AB}$ is used to represent a value in the set S1, $\kappa_{AB}$ is substituted into a secure bit rate calculation formula, and a secure bit rate corresponding to the value can be calculated, that is:

$$K(\kappa_{AB}) = f(\gamma_{ACB}|_{\phi_{AB} = \kappa_{AB}}).$$

Because an actual $\phi_{AB}$ is definitely an element in the set S1, a secure bit rate value may be calculated for each element by traversing all elements in the set S1, and a minimum value among all possible secure bit rate values is used as a secure bit rate of the EB model, that is, $$K = \min_{\kappa_{AD} \in S1} K(\kappa_{AB}) = \min_{\kappa_{AB} \in S1} f(\gamma_{ACB}|_{\phi_{AB} = \kappa_{AB}}).$$

The secure bit rate defined in the foregoing formula is a lower bound of secure bit rates corresponding to true eavesdropping. Therefore, the foregoing secure bit rate can guarantee security. If a calculated value of K is less than or equal to 0, it indicates that quantum key distribution of a current round is unsuccessful. There are a plurality of manners for the foregoing method of traversing the set S1, and this is not limited in this application.

In the EB model provided in this embodiment of this application, measurement results of the m modes $A_1$ to $A_m$ may be considered as a whole, which is equivalent to the first data sequence of the sending device or the sixth data sequence of the receiving device in the PM model disclosed in the previous embodiments; and measurement results of the d modes $C_1$ to $C_d$ may be also considered as a whole, which is equivalent to the second data sequence or the seventh data sequence of the PM model disclosed in the previous embodiments. In addition, because it is usually required, in actual execution, that the l modes $B_1$ to $B_l$ are not associated with each other, the foregoing EB model may be considered as a case in which l EB models each of which includes only one B mode coexist. A case in which l=1 (where the B mode is denoted as $B_0$) may be used as an example. Furthermore, a measurement performed on a C mode is a coherent measurement, and the EB model shown in FIG. 5 satisfies a direct product state relationship between the $B_0$ mode and the C mode after a measurement performed on an A mode is completed. This means that a sent quantum state of the $B_0$ mode is determined based on a measurement result of the A mode. In this case, only if a probability distribution of the measurement result of the A mode in the EB model is set to be the same as a probability distribution of a second optical signal, it can be ensured that the EB model provided in this embodiment is equivalent to the PM model provided in the previous embodiments. In other words, the PM model proposed in the previous embodiments of this application provides strict provable security.

It should be noted that in a process of calculating a secure bit rate by using a covariance matrix, because all the three submatrices $\gamma_A$, $\gamma_C$, and $\phi_{AC}$ may be directly calculated, that is, equivalent to, in an actual execution process, that the three submatrices are preset, and $\gamma_B$ corresponds to the B mode, that is, a measurement result of the second optical signal output from the PM model, $\phi_{AB}$ can be calculated based on the third data sequence or the fifth data sequence, and similarly, $\phi_{BC}$ can be calculated based on the second data sequence and the third data sequence (or the seventh data sequence and the fifth data sequence).

In summary, this application proposes a CV-QKD device that can be implemented, and proposes an EB model that is equivalent to the CV-QKD device and that provides provable security. Therefore, a CV-QKD protocol is constituted. The CV-QKD protocol provided in this application may be applied to a plurality of CV-QKD system architectures, for example, an associated local oscillator system or a local local-oscillator system.

Figure 6:
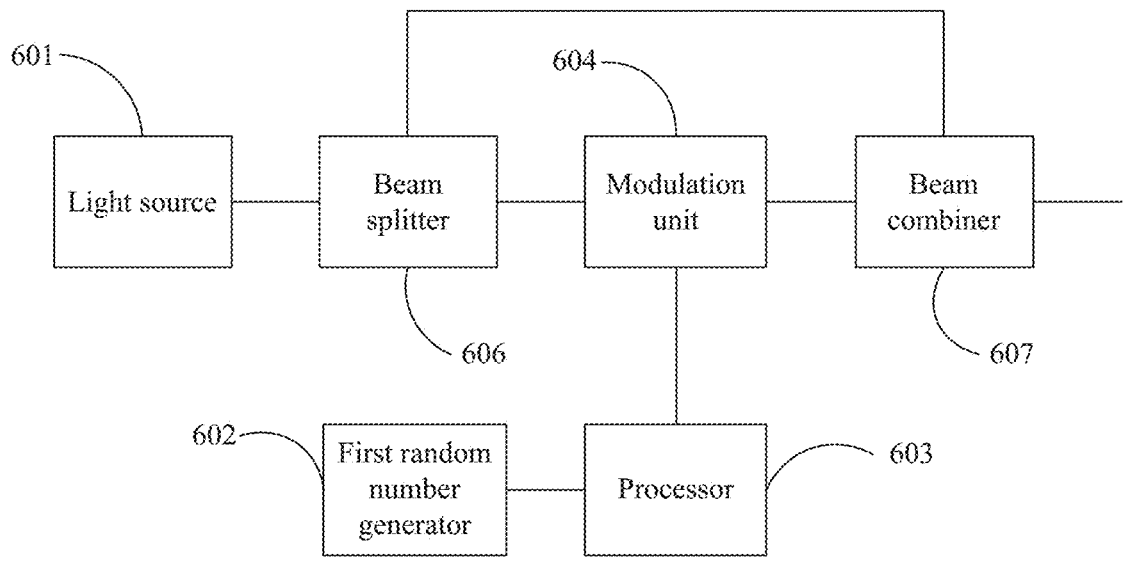
FIG. 6 shows a CV-QKD sending device according to another embodiment of this application.

Another embodiment of this application provides a CV-QKD sending device applied to an associated local oscillator system. As shown in FIG. 6, on a basis of the sending device shown in FIG. 1, a beam splitter 606 and a beam combiner 607 are added. Functions of a light source 601, a first random number generator 602, a processor 603, and a modulating unit 604 are the same as those of the embodiment shown in FIG. 1, and details are not described herein again. The beam splitter 606 is configured to: receive a first optical signal emitted by the light source 601, split the first optical signal into two beams, send a first beam of light to the beam combiner 607, and send a second beam of light to the modulation unit 604. The beam combiner 607 is configured to combine the first beam of light and the modulated second beam of light into one optical signal, and send the optical signal, where the first beam of light is local-oscillator light.

Optionally, the beam splitter 606 may use a polarization maintaining beam splitter or may be a polarization beam splitter; and the beam combiner 607 may use a polarization maintaining beam combiner, or may be a polarization beam combiner.

Figure 7:
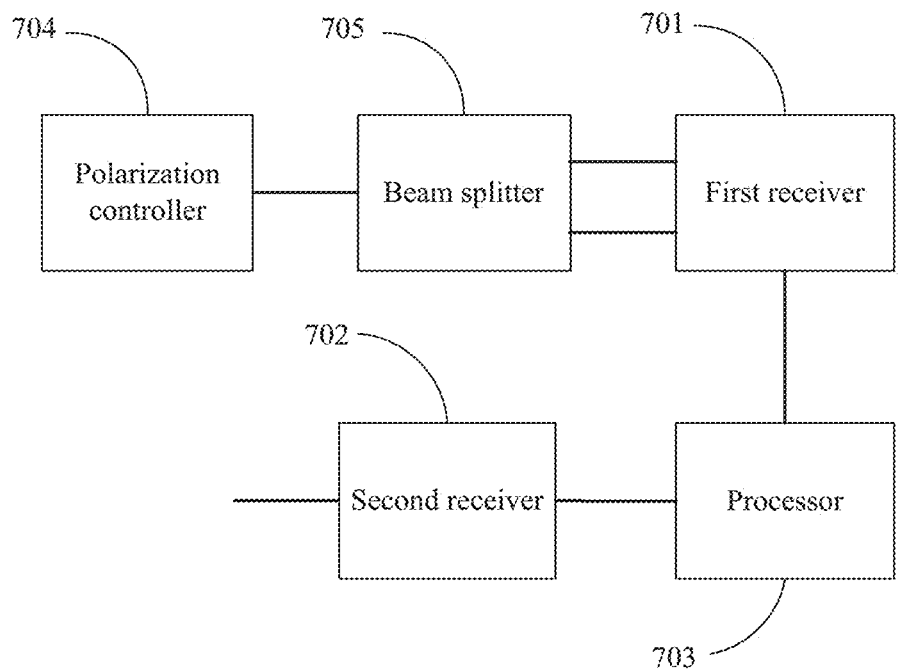
FIG. 7 shows a CV-QKD receiving device according to another embodiment of this application.

Another embodiment of this application further provides a CV-QKD receiving device applied to an associated local oscillator system. As shown in FIG. 7, on a basis of the receiving device shown in FIG. 4, a polarization controller 704 and a beam splitter 705 are added. Functions of a first receiver 701, a second receiver 702, and a processor 703 are the same as those of the embodiment shown in FIG. 4, and details are not described herein again. The polarization controller 704 is configured to adjust polarization states of two beams of light; and the beam splitter 705 is configured to send the two beams of light to the first receiver.

In addition, a CV-QKD protocol provided in this application may be further applied to a local local-oscillator system. In the local local-oscillator system, local-oscillator light is provided by a light source in a receiving device.

It should be further noted that in a CV-QKD system, an output optical signal may be modulated in a single polarization direction, and in this case, the CV-QKD system is referred to as a single-polarization CV-QKD system, may also be modulated in two orthogonal polarization directions, and in this case, the CV-QKD system is referred to as a dual-polarization CV-QKD system, and the protocol provided in this application is applicable to both the single-polarization CV-QKD system and the dual-polarization CV-QKD system, and in addition, in a CV-QKD system, coherent measurement performed by a receiving device may use homodyne measurement, or may use heterodyne measurement, and the protocol provided in this application is applicable to both a CV-QKD system that uses homodyne measurement and a CV-QKD system that uses heterodyne measurement.

To further prove feasibility of the EB model shown in FIG. 5, based on the EB model, another embodiment of this application proposes a more specific EB model and a method for building the EB model. The EB model is denoted as an $EB_0$ model. The following describes the $EB_0$ model in detail.

It is assumed that a set of coherent states that may be sent is $S_\alpha = \{|\alpha_1\rangle, |\alpha_2\rangle, \ldots |\alpha_N\rangle\}$, and N is a finite positive integer greater than or equal to 2. A probability that each coherent state is sent is $P_\alpha = \{p_1, p_2, \ldots p_N\}$, a characteristic quantity representing a coherent state is a complex number $\alpha_k = x_k + iy_k$, and different $\alpha_k$ values represent different coherent states. In classical coherent communications, a constellation diagram is often used to represent a state to be sent. Therefore, the set $S_\alpha$ may be alternatively represented by the constellation diagram, where horizontal axis coordinates represent $x_k$, and vertical axis coordinates represent $y_k$. In this case, the coherent state set $S_\alpha$ is a finite point set in the constellation diagram.

From a perspective of a channel eavesdropper, due to reverse coordination, an information amount finally obtained is related only to $S_\alpha$ and $P_\alpha$, and is not actually related to how the EB model is built. Therefore, under a framework of a built EB model, a secure bit rate obtained based on any EB model is a lower bound of a true secure bit rate. Therefore, for a specific EB model, a higher secure bit rate is desirable.

Considering that calculation of the secure bit rate is determined only based on the covariance matrix $\gamma_{ACB}$, but $\phi_{AB}$ in $\gamma_{ACB}$ is unknown due to a POVM measurement performed on a mode A, and with reference to an idea that there is a unitary transformation between different purifications of a same mixed state so that the purifications may be mutually transformed, a quantity of A modes does not affect a result. Therefore, a simplest case is used, that is, it is assumed that m=1 and the A mode is denoted as $A_0$. In this case, there is only one POVM measurement, and a set of possible value results of the POVM is denoted as $\alpha_0 = \{\alpha_0^i\}_{i=1,\ldots,M}$. In the EB model, when a measurement result of $A_0$ is $\alpha_0^i$, quantum states of remaining modes may be denoted as $$\rho_{CB_0}^{\alpha_0^i}.$$

The $EB_0$ model disclosed in this embodiment of this application has the following important characteristic: for the measurement result $\alpha_o^i$ of $A_0$, there is a direct product state relationship between a C mode and a $B_0$ mode in the quantum states $$\rho_{CB_0}^{\alpha_0^i}$$

of the remaining modes, that is.

$$\rho_{CB_0}^{\alpha_0^i} = \rho_C^{\alpha_0^i} \otimes \rho_{B_0}^{\alpha_0^i}.$$

Therefore, a quantity of elements in the set $\alpha_0 = \{\alpha_0^i\}_{i=1,\ldots,M}$ should be equal to a quantity N of the coherent states that may be sent. When the quantity of elements is greater than N, it means that there are a plurality of measurement results mapped to a same output coherent state. In this case, these measurement elements should be combined and denoted as one POVM measurement element, that is, the quantity of elements is finally equal to N.

To provide a specific design solution, the POVM measurement performed on $A_0$ is selected as a projection measurement $\{P_i = |R_i\rangle\langle R_i|\}$ that is based on a set of orthogonal states $\{R_i\}$, and it is assumed that the C mode is a simplest single mode, that is, d=1, denoted as $C_0$. In this case, a source of the $EB_0$ model is simplified to a three-mode entanglement source whose expression is:

$$|\psi\rangle_{A_0 C_0 B_0} = \sum_{k=1}^{N} \sqrt{p_k} \, |R_k\rangle_{A_0} |\varphi_k\rangle_{C_0} |\alpha_k\rangle_{B_0},$$

where $\{|R_1\rangle_{A_0}, |R_2\rangle_{A_0} \ldots |R_N\rangle_{A_0}\}$ represents N quantum states that are orthogonal to each other; $\{|\varphi_1\rangle_{C_0}, |\varphi_2\rangle_{C_0} \ldots |\varphi_N\rangle_{C_0}\}$ represents N pure states; and $|\alpha_k\rangle B_0$ represents elements in the set $S_\alpha$, indicating a coherent state that may be sent.

Figure 8:
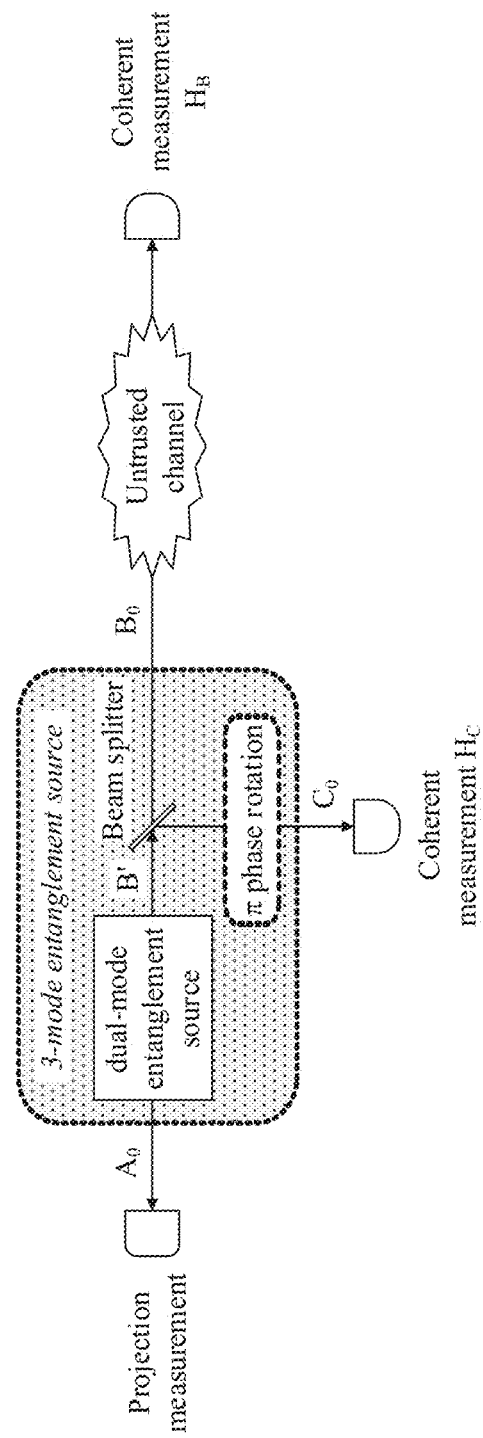
FIG. 8 shows another provable security model according to another embodiment of this application.

To maximize a final secure bit rate, it is assumed that $|\varphi_k\rangle = |t\alpha_k\rangle$, that is, the mode $C_0$ is also selected as a coherent state, and its characteristic value is linearly proportional to a characteristic value of a coherent state to be sent into a channel, and a proportion coefficient is t. This structure can be implemented by a beam splitter, that is, a three-mode entanglement state in the $EB_0$ model is generated after a mode in a dual-mode entanglement state passes through the beam splitter. Specifically, the three-mode entanglement source includes a dual-mode entanglement source and a beam splitter. After a mode B' of the dual-mode entanglement source passes through the beam splitter, two modes $C_0$, $B_0$ are generated. A structure of the $EB_0$ model is shown in FIG. 8. It should be noted that whether a π phase rotation operation in the model is performed is determined by a symbol of t, and transmittance of the beam splitter is $\eta_A = 1/(1+t^2)$.

In the $EB_0$ model shown in FIG. 8, a most critical design is a design of a dual-mode entanglement source.

Specifically, first, it is assumed that transmittance of the beamsplitter is $\eta_A = 0.9$. Then, a constellation diagram to be obtained through modulation performed at $B_0$ is transformed to B'. In short, each constellation point (it is assumed that a coherent state represented by the constellation point is $|\alpha_i\rangle$) is multiplied by $\sqrt{1/\eta_A}$ (the coherent state is transformed into $|\beta_i = \sqrt{1/\eta_A}\alpha_i\rangle$).

Second, an entanglement source is constructed by using a Schmidt orthogonalization method. Assuming that a set of orthogonal bases $\{|\phi_k\rangle_{B'}\}$ and a set of diagonal elements $d_k$ can be found, which satisfy:

$$\sum_{k=1}^{M} d_k |\phi_k\rangle\langle\phi_k| = \sum_{k=1}^{N} p_k |\beta_k\rangle\langle\beta_k|,$$

the dual-mode entanglement source is designed as:

$$|\varphi_{A_0 B'}\rangle = \sum_{k=1}^{M} \sqrt{d_k} \, |\phi_k^*\rangle_{A_0} |\phi_k\rangle_{B'},$$

where a definition of $|\phi_k^*\rangle$ is that: each coefficient that is expanded in a Fock state is a complex conjugate of an expanded coefficient corresponding to $|\phi_k\rangle$, that is, if $$|\phi_k\rangle = \sum_{j=0}^{\infty} c_{kj} |n_j\rangle, \; |\phi_k^*\rangle = \sum_{j=0}^{\infty} c_{kj}^* |n_j\rangle.$$

In the foregoing manner, the dual-mode entanglement source can be constructed, and building of the $EB_0$ model can be further implemented. It should be emphasized that the above described method of constructing the $EB_0$ model and the dual-mode entanglement source is a specific design solution of the EB model shown in FIG. 5, and is not a unique solution.

In the foregoing design solution, the set $S_\alpha$ (that is, the constellation diagram) of the coherent states that may be sent, probability distribution $P_\alpha$ of the corresponding coherent states, and a selected beam splitter transmittance $\eta_A$ determine a specific structure of the dual-mode entanglement source. Therefore, the foregoing three items determine a secure bit rate of a system. Unlike classic communications, QKD is not intended to transmit deterministic information, but to generate a random key. Therefore, the secure bit rate can be optimized by designing different constellation diagrams, distribution of an occurrence probability of each constellation point, and a splitting ratio. Different selection results have different performance. However, the $EB_0$ model does not have any constraint on a location of a constellation point and distribution of an occurrence probability of the constellation point. In other words, the location of the constellation point may be arbitrarily selected, and probability distribution may also be arbitrarily set, provided that final performance can be applied to a corresponding application scenario.

Figure 9:
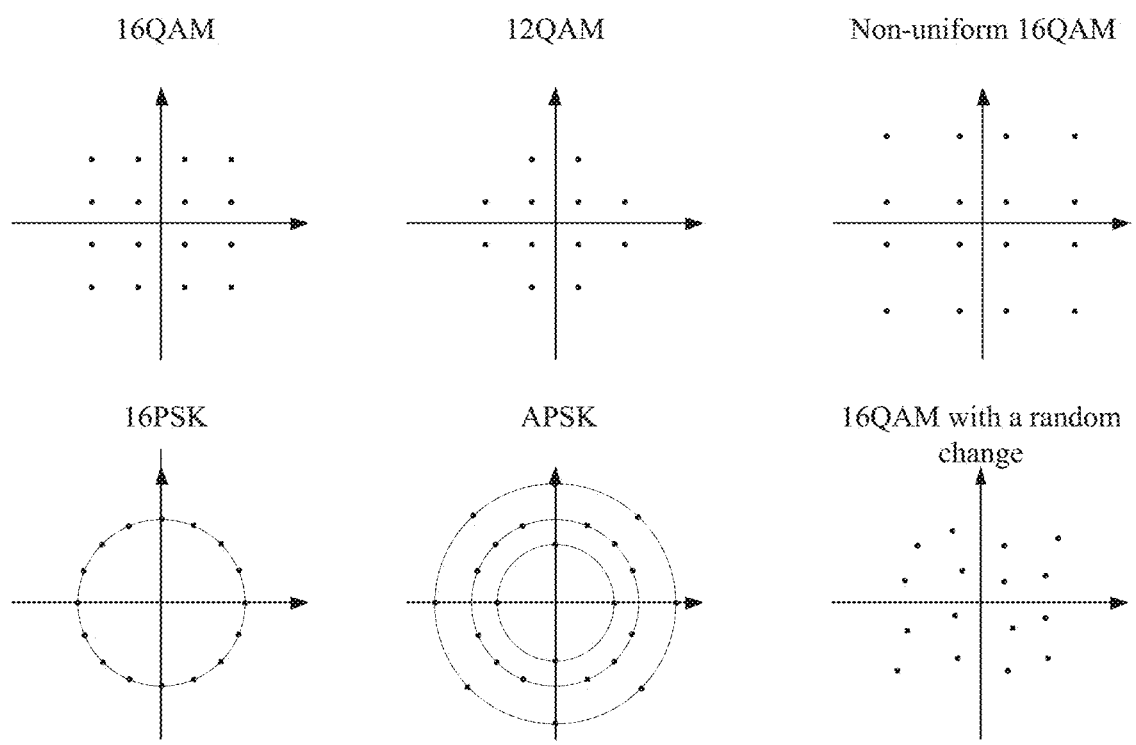
FIG. 9 shows constellation diagrams of some modulation formats that may be applied to a CV-QKD system according to an embodiment of this application.

For example, in the design solution provided in this embodiment, the following options may be selected: (1) a horizontal and vertical equidistantly distributed square quadrature amplitude modulation (QAM) constellation diagram, such as 16QAM, 64QAM, 256QAM, and 1024QAM; (2) a non-square QAM constellation diagram, such as 12QAM formed after 16QAM lacks four corners, and 24QAM distributed in four rows and six columns; (3) a non-horizontal and vertical equidistantly distributed QAM constellation diagram, such as non-uniform 16QAM and non-uniform 64QAM; (4) phase shift keying (PSK) modulation equidistantly distributed on a circumference, such as 16PSK and 64PSK; (5) amplitude phase shift keying (APSK) modulation equidistantly distributed over a plurality of circumferences whose radiuses are different; and (6) a QAM rule modulated constellation point plus a random change, for example, a random displacement independent of the others occurring on each constellation point of 16QAM. FIG. 9 shows patterns of some of the constellation diagrams. A specific location of a constellation point is not limited in this application.

With respect to probability distribution, any one of the following options may be selected: Distribution probabilities of all constellation points are the same; or a probability of each constellation point is proportional to a Gaussian distribution; or probability distribution of constellation points is a randomly selected sequence of positive real numbers whose sum is 1, and so on. This is not limited in this application.

Figure 10A:
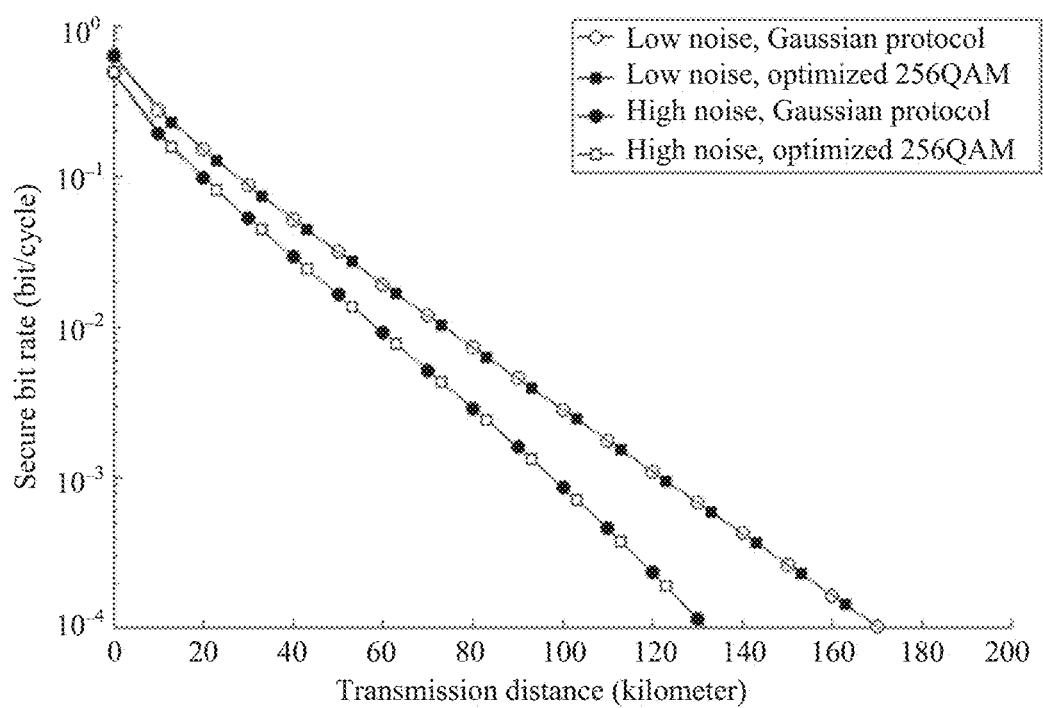
FIG. 10(a) shows a result of comparison between a secure bit rate obtained by using a provable security model shown in FIG. 8 and a secure bit rate obtained by using the Gaussian protocol if 256QAM is used.
Figure 10B:
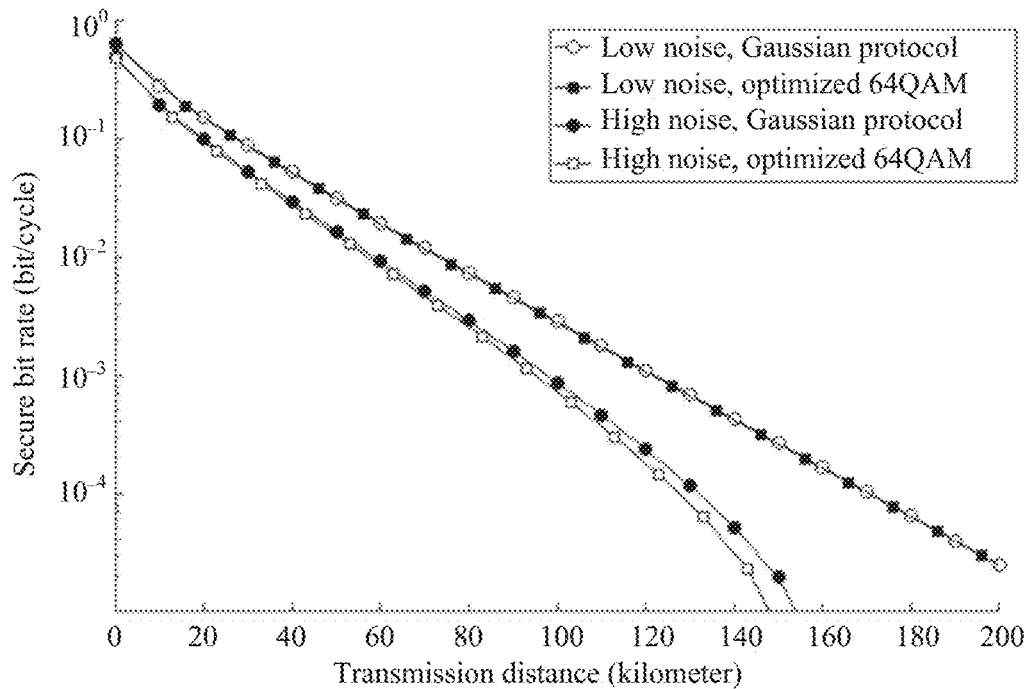
FIG. 10(b) shows a result of comparison between a secure bit rate obtained by using a provable security model shown in FIG. 8 and a secure bit rate obtained by using the Gaussian protocol if 64QAM is used.

To further describe feasibility and performance of the $EB_0$ model, when the CV-QKD protocol provided in this application is used, simulation is performed on secure bit rates of probability distribution optimized 64QAM and probability distribution optimized 256QAM under different noises, and comparison is performed between the secure bit rates and a secure bit rate that is obtained according to the Gaussian protocol under a same condition (for example, a same noise and a same device hardware parameter). Referring to FIG. 10(a) and FIG. 10(b), probability distribution optimized 64QAM means that probability distribution of constellation points of 64QAM conforms to discrete Gaussian distribution, and probability distribution optimized 256QAM means that probability distribution of constellation points of 256QAM conforms to discrete Gaussian distribution. Results show that probability distribution optimized 256QAM has almost the same performance as performance required in the Gaussian protocol, no matter in a high-noise condition or in a low-noise condition. In addition, although performance of probability distribution optimized 64QAM approaches performance required in the Gaussian protocol only under the low-noise condition, performance of probability distribution optimized 64QAM is not much different from performance required in the Gaussian protocol in the high-noise condition.

Specifically, units of horizontal axis coordinates in FIG. 10(a) and FIG. 10(b) are kilometers (km). Herein, it is assumed that an optical channel is an optical fiber, and an attenuation coefficient of the optical fiber is 0.2 dB/km. The optical channel in this solution includes, but is not limited to, a fiber channel, a free space optical channel, and the like.

It should be noted that the foregoing manner of constructing a constellation diagram and an entanglement source is merely an implementation of the method proposed in this patent. This means that the manner may be further optimized. Even if only this implementation is used, a system to which this embodiment of this application is applied needs only a constellation diagram with 256 constellation points. In most cases, a constellation diagram with only 64 constellation points may be used and achieves performance close to performance required in the Gaussian protocol. This means that for a modulation device, modulation of each regular component requires control precision of only 3 bits to 4 bits. The precision is much lower than control precision of 8 bits or more required in the Gaussian protocol.

Specifically, because of existence of the C mode (equivalent to the second data sequence or the seventh data sequence in the PM model) in the EB model in this application, the covariance matrix in the foregoing embodiments can be obtained, and quantum states with a quantity in an order of magnitude of $2^8 \times 2^8$ required in an existing Gaussian protocol may not need to be modulated: alternatively, the secure bit rate may be calculated based on the covariance matrix, to reduce implementation difficulty.

Figure 11:
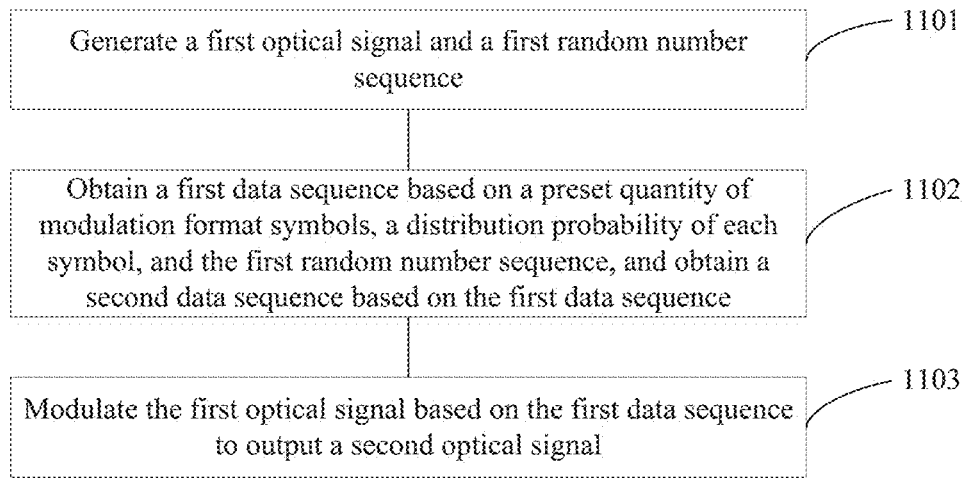
FIG. 11 is a flowchart of a CV-QKD sending method according to another embodiment of this application.

Another embodiment of this application further provides a CV-QKD sending method. As shown in FIG. 11, the method includes the following steps.

1101: Generate a first optical signal and a first random number sequence.

1102: Obtain a first data sequence based on a preset quantity of modulation format symbols, a distribution probability of each symbol, and the first random number sequence, and obtain a second data sequence based on the first data sequence, where the first data sequence and the second data sequence are used for obtaining a secure bit rate.

1103: Modulate the first optical signal based on the first data sequence to output a second optical signal, where the second optical signal includes n quantum states, and n is a positive integer not less than 8.

In this embodiment, attenuation may be performed before the first optical signal is modulated, or attenuation may be performed after the first optical signal is modulated. This is not limited in this embodiment. It should be noted that if attenuation is performed before modulation, attenuation caused by a modulator to a signal needs to be considered, to ensure that strength of the second optical signals output in the two manners is in a same order of magnitude.

Optionally, a specific manner of obtaining a second data sequence based on the first data sequence includes the following: (1) obtaining the second data sequence based on a selected probability distribution function and an obtained second random number sequence, where the selected probability distribution function is determined based on data in the first data sequence; (2) obtaining fourth data based on a preset probability distribution function and an obtained second random number sequence, and adding a selected value to the fourth data to obtain second data, where the selected value is determined based on data in the first data sequence, and the second data sequence includes a plurality of pieces of the second data; and (3) each piece of data in the first data sequence corresponds to a preset value, and a plurality of the preset values form the second data sequence, with no need to introduce a new random number sequence. A specific implementation of the foregoing solution of generating the second data sequence has been described in detail in the sending device embodiment, and details are not described herein again.

Figure 12:
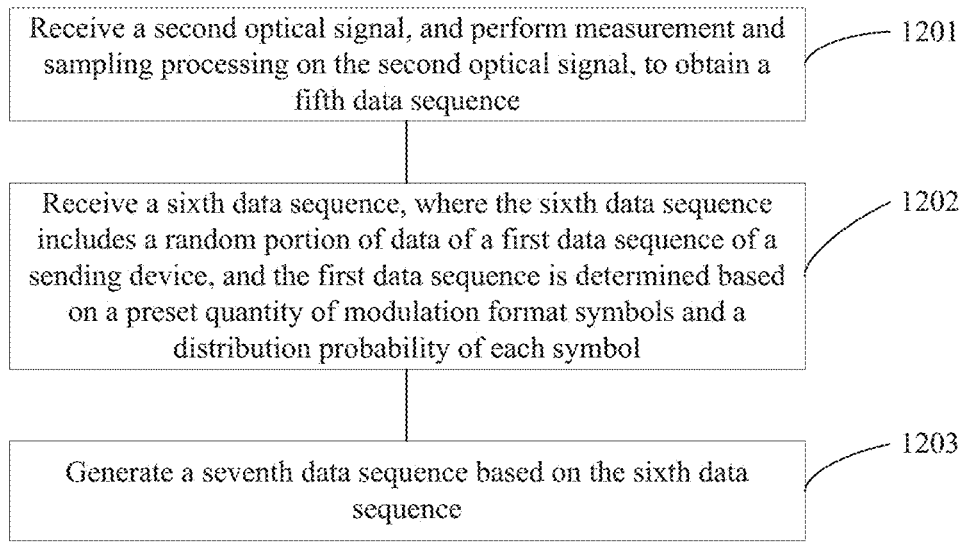
FIG. 12 is a flowchart of a CV-QKD receiving method according to another embodiment of this application.

Another embodiment of this application further provides a CV-QKD receiving method. As shown in FIG. 12, the method includes the following steps.

1201: Receive a second optical signal, and perform measurement and sampling processing on the second optical signal to obtain a fifth data sequence, where the second optical signal is sent by a sending device and includes n quantum states, and n is a positive integer not less than 8.

1202: Receive a sixth data sequence, where the sixth data sequence includes a random portion of data of a first data sequence of the sending device, and the first data sequence is determined based on a preset quantity of modulation format symbols and a distribution probability of each symbol.

1203: Generate a seventh data sequence based on the sixth data sequence, where the sixth data sequence and the seventh data sequence are used for obtaining a secure bit rate.

It should be noted that, a manner of generating the seventh data sequence based on the sixth data sequence is the same as the method of generating, by the sending device, the second data sequence based on the first data sequence. Details are not described herein again in this application.

Figure 13:
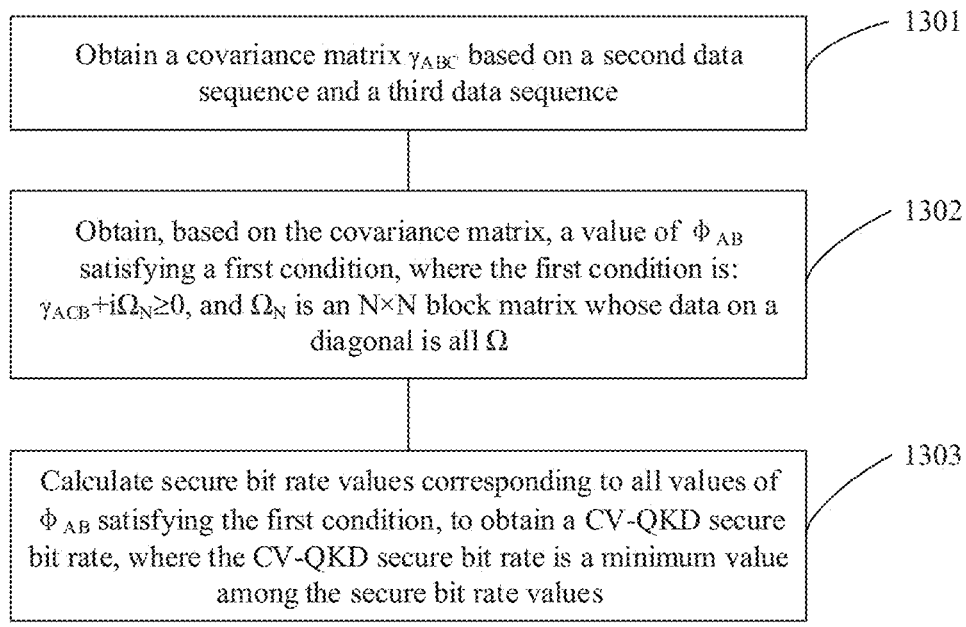
FIG. 13 is a flowchart of a CV-QKD secure bit rate calculation method according to another embodiment of this application.

Another embodiment of this application further provides a CV-QKD secure bit rate calculation method. As shown in FIG. 13, the method includes the following steps.

1301: Obtain a covariance matrix $$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix}$$

based on a second data sequence and a third data sequence, where $\gamma_A$, $\varphi_{AC}$, and $\gamma_C$ are preset values, $\varphi_{CB}$ is obtained based on the second data sequence and the third data sequence, $\gamma_B$ is obtained based on the third data sequence, and a superscript T represents matrix transposition; the second data sequence is determined based on a first data sequence, a determining manner may be any one of the manners disclosed in the previous embodiments, and the first data sequence is determined based on a preset quantity of modulation format symbols and a distribution probability of each symbol; and the third data sequence is a random portion of data of a measurement value obtained after an optical signal sent by a CV-QKD sending device passes through an optical channel.

1302: Obtain, based on the covariance matrix, a value of $\varphi_{AB}$ satisfying a first condition, where the first condition is: $\gamma_{ACB} + i\Omega_N \geq 0$, $\Omega_N$ is an N×N block matrix whose data on a diagonal is all $\Omega$, $$\Omega = \begin{pmatrix} 0 & 1 \\ -1 & 0 \end{pmatrix}.$$

and N is a positive integer not less than 3.

1303: Calculate secure bit rate values corresponding to all values of $\varphi_{AB}$ satisfying the first condition, to obtain a CV-QKD secure bit rate, where the CV-QKD secure bit rate is a minimum value among the secure bit rate values.

Optionally, the secure bit rate calculation method may be applied to a CV-QKD sending device or a CV-QKD receiving device. When the secure bit rate calculation method is applied to the sending device, data sequences used in the secure bit rate calculation method have a one-to-one correspondence with data sequences in the sending device embodiment or the sending method embodiment; when the secure bit rate calculation method is applied to the receiving device, the first data sequence, the second data sequence, and the third data sequence in the secure bit rate calculation method correspond to the sixth data sequence, the seventh data sequence, and the fifth data sequence in the receiving device embodiment or the receiving method embodiment, respectively.

The embodiments of this application further provide a computer storage medium, configured to store a computer software instruction that implements the secure bit rate calculation method shown in FIG. 13, where the computer software instruction includes a program designed for performing the foregoing method embodiment. A CV-QKD secure bit rate calculation method provided in the embodiments of this application can be implemented by executing the stored program.

It should be noted that, for brief description, the foregoing method embodiments are represented as a series of actions. However, a person skilled in the art should appreciate that the present invention is not limited to the described order of the actions, because according to this application, some steps may be performed in other orders or simultaneously.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step. A single processor or another unit may implement one or more functions enumerated in the claims. Some measures are described in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. In addition, the present invention may use a form of a computer program product that is implemented on one or more computer usable storage media (including but not limited to a disk memory, a CD-ROM, an optical memory, and the like) that include computer usable program code. The computer program is stored/distributed in an appropriate medium and is provided as or used as a part of the hardware together with other hardware, or may also use another distribution form, such as by using the Internet or another wired or wireless telecommunications system.

Although this application is described with reference to specific features and the embodiments thereof, apparently, various modifications and combinations may be made to them without departing from the scope of this application. Correspondingly, the specification and accompanying drawings are merely example descriptions of the present invention defined by the accompanying claims, and are considered as any or all modifications, variations, combinations or equivalents that cover the scope of the present invention. Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A continuous-variable quantum key distribution (CV-QKD) sending device, wherein the device comprises a light source, a modulation unit, a first random number generator, and a processor, wherein the light source generates a first optical signal;

the first random number generator generates a first random number sequence;

the processor receivesthe first random numbersequence, obtain a first data sequence based on a preset quantity of modulation format symbols, a distribution probability of each symbol, and the first random number sequence, and obtain a second data sequence based on the first data sequence, wherein the first data sequence and the second data sequence are used for obtaining a secure bit rate;

the modulation unit receives the first optical signal, and modulate the first optical signal based on a control signal to output a second optical signal, wherein the control signal is generated based on the first data sequence, the second optical signal comprises n quantum states, and n is a positive integer not less than 8;

wherein the receiver receives a third data sequence, and the third data sequence comprises a random portion of data of a measurement value obtained after the second optical signal passes through an optical channel;

the processor is further configured to obtain a covariance matrix $$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix}$$

based on the second data sequence and the third data sequence, wherein 7A, TAC, and yc are preset values, and CCB is obtained based on the second data sequence and the third data sequence, yB is obtained based on the third data sequence, and a superscript T represents matrix First Named Inventor transposition; obtain, based on the covariance matrix, a value of cpm satisfying a first condition, wherein the first condition is: yAcB+iQN>0, QN is an N×N block matrix whose data on a diagonal is Ω, $$\Omega = \begin{pmatrix} 0 & 1 \\ -1 & 0 \end{pmatrix},$$

and N is a positive integer not less than 3; and all calculate secure bit rate values corresponding to all values of CPAB satisfying the first condition, to obtain a CV-QKD secure bit rate, wherein the CV-QKD secure bit rate is a minimum value among the secure bit rate values; and wherein the sending device sends the secure bit and coherent state to a receiving device through an untrusted channel.

2. The device according to claim 1, wherein the obtaining a second data sequence based on the first data sequence specifically comprises: obtainingthe second data sequence based on a selected probability distribution function in a preset probability distribution function set and an obtained second random number sequence, wherein the selected probability distribution function isdetermined based on data in the first data sequence and representsa distribution probability of data in the second data sequence.

3. The device according to claim 1, wherein the obtaining a second data sequence based on the first data sequence specifically comprises: obtainingfourth data based on a preset probability distribution function and an obtained second random number sequence, and adding a selected value to the fourth data to obtain second data, wherein the preset probability distribution function represents a distribution probability of the fourth data, the selected value is determined based on data in the first data sequence, and the second data sequence comprises a plurality of pieces of the second data.

4. The device according to claim 2, wherein the obtaining the second data sequence based on a selected probability distribution function and an obtained second random number sequence specifically comprises: obtaining a value set of second data and an occurrence probability of each value in the value set based on the selected probability distribution function and a preset value range of the second data; and selecting a value of the second data from the value set based on a correspondence between a value represented by M second random numbers and a value in the value set, wherein the correspondence is set based on an occurrence probability of each value represented by the M second random numbers and the occurrence probability of each value in the value set, at least one value represented bythe M second random numbers corresponds to a value in the value set, a sum of occurrence probabilities of the at least one value is the same as a sum of occurrence probabilities of correspondingvalues in the value set, and M is a positive integer.

5. A continuous-variable quantum key distribution (CV-QKD) sending method, wherein the method comprises:

generating a first optical signal and a first random number sequence;

obtaining a first data sequence based on a preset quantity of modulation format symbols, a distribution probability of each symbol, and the first random number sequence, and obtaining a second data sequence based on the first data sequence, wherein the first data sequence and the second data sequence are used for obtaininga secure bit rate;

modulating the first optical signal based on the first data sequence to output a second optical signal, wherein the second optical signal comprises n quantum states, and n is a positive integer not less than 8;

obtaining a covariance matrix $$\gamma_{ACB} = \begin{pmatrix} \gamma_A & \phi_{AC} & \phi_{AB} \\ \phi_{AC}^T & \gamma_C & \phi_{CB} \\ \phi_{AB}^T & \phi_{CB}^T & \gamma_B \end{pmatrix}$$

based on the second data sequence and a third data sequence, wherein 7A, TAC, and yc are preset values, and DCB is obtained based on the second data sequence and the third data sequence, yB is obtained based on the third data sequence, a superscript T represents matrix transposition, and the third data sequence comprises a random portion of data of a measurement value obtained after the second optical signal passes through an optical channel; obtaining, based on the covariance matrix, a value of 4AS satisfying a first condition, wherein the first condition is: 7ACS+iQN>0, QN is an N×N block matrix whose data on a diagonal is all Ω, $$\Omega = \begin{pmatrix} 0 & 1 \\ -1 & 0 \end{pmatrix},$$

and N is a positive integer not less than 3; and calculating secure bit rate values corresponding to all values of 4AB satisfying the first condition, to obtain a CV-QKD secure bit rate, wherein the CV-QKD secure bit rate is a minimum value among the secure bit rate values; and wherein the sending device sends the secure bit and coherent state to a receiving device through an untrusted channel.

6. The method according to claim 5, wherein before the obtaining a second data sequence based on the first data sequence, the method further comprises: generating a second random number sequence; and the obtaininga second data sequence based on the first data sequence specifically comprises: obtainingthe second data sequence based on a selected probability distribution function in a preset probability distribution function set and the second random number First Named Inventor sequence, wherein the selected probability distribution function is determined based on data in the first data sequence and represents a distribution probability of data in the second data sequence.

7. The method according to claim 5, wherein before the obtaining a second data sequence based on the first data sequence, the method further comprises: generating a second random number sequence; and the obtaininga second data sequence based on the first data sequence specifically comprises: obtaining fourth data based on a preset probability distribution function and the obtained second random number sequence, and adding a selected value to the fourth data to obtain second data, wherein the selected value is determined based on data in the first data sequence, the second data sequence comprisesa plurality of pieces of the second data, and the preset probability distribution function represents a distribution probability of data in the second data sequence.

8. The method according to claim 6, wherein the obtaining the second data sequence based on a selected probability distribution function and the second random number sequence specifically comprises: obtaining a value set of second data and an occurrence probability of each value in the value set based on the selected probability distribution function and a preset value range of the second data; and selecting a value of the second data from the value set based on a correspondence between a value represented by M second random numbers and a value in the value set, wherein the correspondence is set based on an occurrence probability of each value represented by the M second random numbers and the occurrence probability of each value in the value set, at least one value represented by the M second random numbers corresponds to a value in the value set, a sum of occurrence probabilities of the at least one value is the same as a sum of occurrence probabilities of corresponding values in the value set, and M is a positive integer.

* * * * *

UNITED STATES PATENT AND TRADEMARK OFFICE
CERTIFICATE OF CORRECTION

PATENT NO. : 11,329,810 B2
APPLICATION NO. : 16/817125
DATED : May 10, 2022
INVENTOR(S) : Zhengyu Li and Changzheng Su It is certified that error appears in the above-identified patent and that said Letters Patent is hereby corrected as shown below:

In the Claims

Column 32/Line 54 - In Claim 1, delete "receivesthe" and insert -- receives the --.

Column 32/Line 54 - In Claim 1, delete "numbersequence," and insert -- number sequence, --.

Column 33/Line 40 - In Claim 2, delete "obtainingthe" and insert -- obtaining the --.

Column 33/Line 44 - In Claim 2, delete "isdetermined" and insert -- is determined --.

Column 33/Line 45 - In Claim 2, delete "representsa" and insert -- represents a --.

Column 33/Line 49 - In Claim 3, delete "obtainingfourth" and insert -- obtaining fourth --.

Column 34/Line 4 - In Claim 4, delete "bythe" and insert -- by the --.

Column 34/Line 8 - In Claim 4, delete "correspondingvalues" and insert -- corresponding values --.

Column 34/Line 20 - In Claim 5, delete "obtaininga" and insert -- obtaining a --.

Column 34/Line 63 - In Claim 6, delete "obtaininga" and insert -- obtaining a --.

Column 34/Line 65 - In Claim 6, delete "obtainingthe" and insert -- obtaining the --.

Column 35/Line 1 - In Claim 6, after "number" delete "First Named Inventor".

Column 35/Line 8 (Approx.) - In Claim 7, delete "obtaininga" and insert -- obtaining a --.

Column 35/Line 15 (Approx.) - In Claim 7, delete "comprisesa" and insert -- comprises a --.

Signed and Sealed this
Fourth Day of October, 2022

Katherine Kelly Vidal
*Director of the United States Patent and Trademark Office*